United States Patent
Zhou

(10) Patent No.: US 9,247,266 B2
(45) Date of Patent: Jan. 26, 2016

(54) TEMPORAL MOTION DATA CANDIDATE DERIVATION IN VIDEO CODING

(75) Inventor: Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 855 days.

(21) Appl. No.: 13/438,343

(22) Filed: Apr. 3, 2012

(65) Prior Publication Data

US 2012/0263231 A1    Oct. 18, 2012

Related U.S. Application Data

(60) Provisional application No. 61/476,407, filed on Apr. 18, 2011, provisional application No. 61/540,241, filed on Sep. 28, 2011.

(51) Int. Cl.

| | |
|---|---|
| *H04N 19/463* | (2014.01) |
| *H04N 19/52* | (2014.01) |
| *H04N 19/96* | (2014.01) |
| *H04N 19/109* | (2014.01) |

(52) U.S. Cl.
CPC ............ *H04N 19/463* (2014.11); *H04N 19/109* (2014.11); *H04N 19/52* (2014.11); *H04N 19/96* (2014.11)

(58) Field of Classification Search
CPC ............ H04N 19/52; H04N 19/00587; H04N 19/00684; H04N 19/00733; H04N 19/51; H04N 19/593; H04N 19/00096; H04N 19/00381; H04N 19/00569; H04N 19/00696; H04N 19/00763; H04N 19/126; H04N 19/198; H04N 19/513; H04N 19/61; H04N 19/105; H04N 19/107; H04N 19/109; H04N 19/136; H04N 19/167; H04N 19/436; H04N 19/463; H04N 19/82; H04N 19/96

USPC ............ 375/240.03, 240.12, 240.16, 240.25, 375/240.26

See application file for complete search history.

(56) References Cited

U.S. PATENT DOCUMENTS

| | | |
|---|---|---|
| 2012/0008688 A1 | 1/2012 | Tsai et al. |
| 2012/0128060 A1* | 5/2012 | Lin et al. ................. 375/240.02 |

(Continued)

OTHER PUBLICATIONS

Benjamin Bross et al., "WD5: Working Draft 5 of High-Efficiency Video Coding", JCTVC-G1103_d9, Nov. 21-30, 2011, pp. 1-223, Joint Collaborative Team on Video Coding (JCT-VC) of ITU-T SG16 WP3 and ISO/IEC JTC1/SC29/WG11, Geneva, Switzerland.

(Continued)

*Primary Examiner* — Sath V Perungavoor
*Assistant Examiner* — Nathnael Aynalem
(74) *Attorney, Agent, or Firm* — Charles A. Brill; Frank D. Cimino

(57) ABSTRACT

A method for derivation of a temporal motion data (TMD) candidate for a prediction unit (PU) in video encoding or video decoding is provided. The derived TMD candidate is for inclusion in an inter-prediction candidate list for the PU. The method includes determining a primary TMD position relative to a co-located PU in a co-located largest coding unit (LCU), wherein the co-located PU is a block in a reference picture having a same size, shape, and coordinates as the PU, and selecting at least some motion data of a secondary TMD position as the TMD candidate when the primary TMD position is in a bottom neighboring LCU or in a bottom right neighboring LCU of the co-located LCU, wherein the secondary TMD position is determined relative to the co-located PU.

12 Claims, 19 Drawing Sheets

(56) References Cited

U.S. PATENT DOCUMENTS

| | | | |
|---|---|---|---|
| 2012/0134415 A1* | 5/2012 | Lin et al. | 375/240.16 |
| 2012/0134416 A1* | 5/2012 | Lin et al. | 375/240.16 |
| 2012/0219064 A1* | 8/2012 | Zheng et al. | 375/240.16 |
| 2012/0236941 A1* | 9/2012 | Lin et al. | 375/240.16 |
| 2012/0236942 A1* | 9/2012 | Lin et al. | 375/240.16 |

OTHER PUBLICATIONS

Minhua Zhou, "Non-CE9: Modified H Positions for Memory Bandwidth Reduction in TMVP Derivation", JCTVC-G082, Nov. 19-30, 2011, pp. 1-10, Joint Collaborative Team on Video Coding (JCT-VC) of ITU-T SG16 WP3 and ISO/IEC JTC1/SC29/WG11, Geneva, Switzerland.

Benjamin Bross et al., "WD4: Working Draft 4 of High-Efficiency Video Coding", JCTVC-F803_d6, Jul. 14-22, 2011, pp. 1-217, Joint Collaborative Team on Video Coding (JCT-VC) of ITU-T SG16 WP3 and ISO/IEC JTC1/SC29/WG11, Torino, Italy.

Minhua Zhou, "CE1: Evaluation results on A.09, A.13-16 and an Alternative Solution" JCTVC-F081, Jul. 14-22, 2011, pp. 1-6, Joint Collaborative Team on Video Coding (JCT-VC) of ITU-T SG16 WP3 and ISO/IEC JTC1/SC29/WG11, Torino, Italy.

Thomas Wiegand et al., "WD3: Working Draft 3 of High-Efficiency Video Coding", JCTVC-E603, Mar. 16-23, 2011, pp. 1-215, Joint Collaborative Team on Video Coding (JCT-VC) of ITU-T SG16 WP3 and ISO/IEC JTC1/SC29/WG11, Geneva, Switzerland.

Benjamin Bross et al., "High Efficiency Video Coding (HEVC) Text Specification Draft 6", JCTVC-H1003, Nov. 21-30, 2011, pp. 1-249, Joint Collaborative Team on Video Coding (JCT-VC) of ITU-T SG16 WP3 and ISO/IEC JTC1/SC29/WG11, Geneva, Switzerland.

Jian-Liang Lin et al., "Motion Vector Coding Techniques for HEVC", 2011 IEEE 13th International Workshop on Multimedia Signal Processing, Oct. 17-19, 2011, pp. 1-6, Hangzhou, Taiwan.

* cited by examiner

US 9,247,266 B2

TEMPORAL MOTION DATA CANDIDATE DERIVATION IN VIDEO CODING

CROSS-REFERENCE TO RELATED APPLICATIONS

This application claims benefit of U.S. Provisional Patent Application Ser. No. 61/476,407, filed Apr. 18, 2011, and U.S. Provisional Patent Application Ser. No. 61/540,241, filed Sep. 28, 2011, both of which are incorporated herein by reference in their entirety.

BACKGROUND OF THE INVENTION

1. Field of the Invention

Embodiments of the present invention generally relate to temporal motion data candidate derivation in video coding.

2. Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. Several coding efficiency enhancement tools are proposed in HEVC, among them a merge mode designed to reduce coding overhead by allowing an inter-predicted prediction unit (PU) to inherit motion data, i.e., motion vectors, prediction direction, and reference picture indices, from a position selected from neighboring motion data positions in the same picture and a temporal motion data position derived based on a co-located block of the same size as the PU in a reference picture, referred to as the co-located PU. A skip mode is also included that can be seen as a coding unit (CU) level merge mode with all zero transform coefficients. Regular motion vector coding for inter-prediction of a PU also considers motion vectors of selected neighboring motion data positions in the same picture and a temporal motion data position derived based on a co-located PU for use as motion vector predictors for the PU.

The temporal motion data from the co-located PU plays an important role in improving the motion compensation efficiency for merge and skip modes, and in motion vector prediction accuracy for differential motion vector coding of regular inter-predicted PUs. To derive a temporal motion data candidate for the current PU, temporal motion data in or near the co-located PU are fetched and scaled according to the temporal distances. A co-located LCU/CU/PU is defined as a rectangular area in a reference picture with the same coordinates, size, and shape as the current LCU/CU/PU in the current picture. While the use of temporal motion data for merge mode, skip mode, and regular motion vector prediction does reduce coding overhead, additional improvements are desirable.

SUMMARY

Embodiments of the present invention relate to methods and apparatus for temporal motion data candidate derivation in video coding. In one aspect, a method for derivation of a temporal motion data (TMD) candidate for a prediction unit (PU) in video encoding or video decoding is provided in which the TMD candidate is derived for inclusion in an inter-prediction candidate list for the PU. The method includes determining a primary TMD position relative to a co-located PU in a co-located largest coding unit (LCU), wherein the co-located PU is a block in a reference picture having a same size, shape, and coordinates as the PU, and selecting at least some motion data of a secondary TMD position as the TMD candidate when the primary TMD position is in a bottom neighboring LCU or in a bottom right neighboring LCU of the co-located LCU, wherein the secondary TMD position is determined relative to the co-located PU.

In one aspect, a method for derivation of a temporal merging candidate for a prediction unit (PU) in video encoding or video decoding is provided in which the temporal merging candidate is derived for inclusion in a merging candidate list for the PU. The method includes determining a primary temporal motion data (TMD) position relative to a co-located PU in a co-located largest coding unit (LCU), wherein the co-located PU is a block in a reference picture having a same size, shape, and coordinates as the PU and the primary TMD position is a bottom right neighboring position outside the co-located PU, and selecting motion data of a secondary TMD position as the temporal merging candidate when the primary TMD position is in a bottom neighboring LCU or in a bottom right neighboring LCU of the co-located LCU, wherein the secondary TMD position is inside the co-located PU.

In one aspect, a method for derivation of a temporal motion vector predictor (MVP) candidate for a prediction unit (PU) in video encoding or video decoding is provided in which the temporal MVP candidate is derived for inclusion in an advanced MVP (AMVP) candidate list for the PU. The method includes determining a primary temporal motion data (TMD) position relative to a co-located PU in a co-located largest coding unit (LCU), wherein the co-located PU is a block in a reference picture having a same size, shape, and coordinates as the PU and the primary TMD position is a bottom right neighboring position outside the co-located PU, and selecting motion vector data from motion data of a secondary TMD position as the temporal MVP candidate when the primary TMD position is in a bottom neighboring LCU or in a bottom right neighboring LCU of the co-located LCU, wherein the secondary TMD position is inside the co-located PU.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
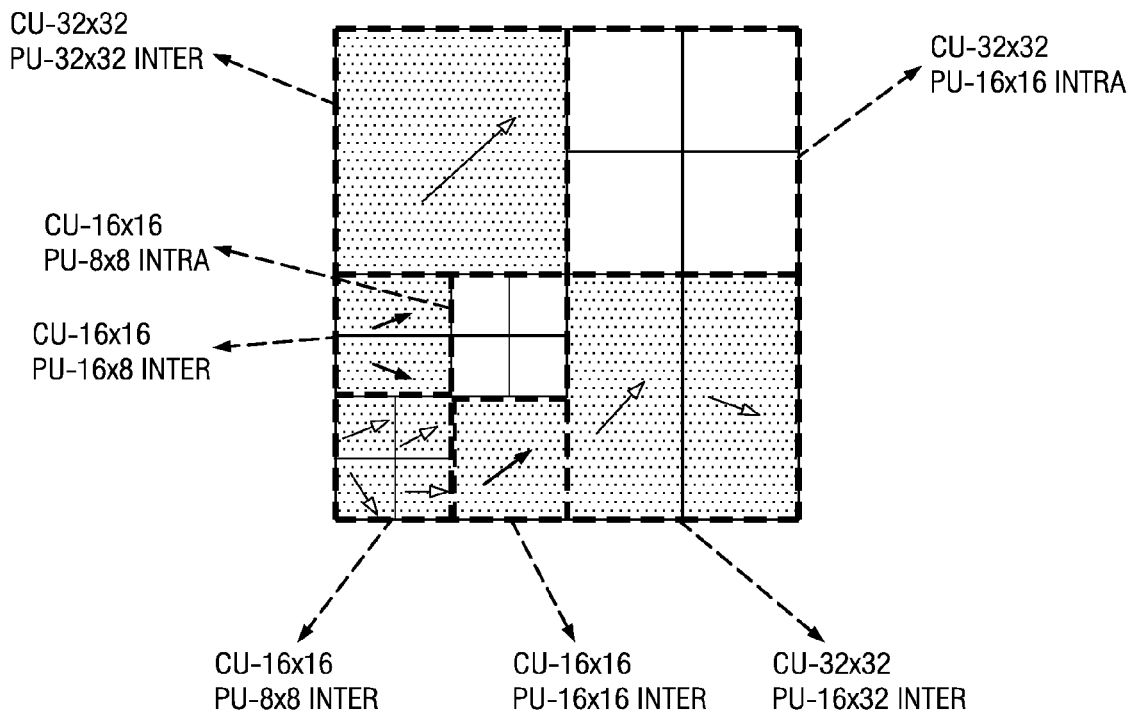
FIG. 1 is an example of decomposition of a largest coding unit (LCU) into coding units (CUs) and prediction units (PUs)

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the LCU and the size of the smallest CU (SCU) permitted.

The coding node is the root node of two trees, a prediction tree and a transform tree. A prediction tree specifies the position and size of prediction units (PU) for a coding unit. A PU is the basic unit for carrying the information related to the prediction processes such as inter and intra-prediction. In general, a PU is not restricted to a square shape in order to facilitate partitioning that matches boundaries of real objects in a picture. A CU may be partitioned into one or more PUs. A transform tree specifies the position and size of transform units (TU) for a coding unit. A transform unit may not be larger than a coding unit. The sizes of the transforms units and prediction units for a CU are determined by the video encoder during prediction based on minimization of rate/distortion costs. FIG. 1 shows an example of an LCU of size 64×64 that is decomposed into CUs and PUs. In this example, the SCU size is 16×16. In HEVC, the SCU size may be as small as 8×8.

As used herein, a co-located PU or temporally co-located PU is a rectangular or square area in a reference picture having the same coordinates, size, and shape of a PU in a picture currently being encoded or decoded, i.e., a PU for which a merging candidate list or an advanced motion vector predictor (AMVP) candidate list is being constructed. As is well-known, PU partitioning may change from LCU to LCU, and from picture to picture. Thus, a co-located PU does not necessarily correspond to an actual PU of the reference picture. Rather, depending on the size, the co-located PU may overlap one actual PU, multiple actual PUs, portions of several actual PUs, a portion of an actual PU, etc. in the reference picture.

As used herein, a co-located CU or temporally co-located CU is a square area in a reference picture having the same coordinates, size, and shape of a CU in a picture currently being encoded or decoded, i.e., a CU for which a merging candidate list is being constructed. As is well-known, CU partitioning may change from LCU to LCU, and from picture to picture. Thus, a co-located CU does not necessarily correspond to an actual CU of the reference picture. Rather, depending on the size, the co-located CU may overlap one actual CU, multiple actual CUs, portions of several actual CUs, a portion of an actual CU, etc. in the reference picture.

As used herein, a co-located LCU or temporally co-located LCU is a square area in a reference picture having the same coordinates, size, and shape of an LCU in a picture currently being encoded or decoded, i.e., an LCU containing the PU for which a merging candidate list or an advanced motion vector predictor (AMVP) candidate list is being constructed or the CU for which a merging candidate list is being constructed. As is well-known, LCU partitioning may change from picture to picture if the two pictures refer to different sequence parameter sets (SPS). Thus, a co-located LCU does not necessarily correspond to an actual LCU of the reference picture. Rather, depending on the size, the co-located LCU may overlap one actual LCU, multiple actual LCUs, portions of several actual LCUs, a portion of an actual LCU, etc. in the reference picture.

Some aspects of this disclosure have been presented to the JCT-VC in the following documents: M. Zhou, "Non-CE9: Modified H Positions for Memory Bandwidth Reduction in TMVP Derivation" JCTVC-G082, Nov. 19-30, 2011, and M. Zhou, "CE1: Evaluation Results on A.09, A.13-16 and an Alternative Solution", JCTVC-F081, Jul. 14-22, 2011, which are incorporated by reference herein in their entirety.

As previously discussed, merge mode, skip mode, and regular motion vector coding based on spatially neighboring PUs and a temporally co-located PU for inter-prediction of PUs are proposed in HEVC. General descriptions of merge mode, skip mode, and regular motion vector coding are provided herein. More detailed descriptions of the emerging proposal may be found in K. McCann, et al., "High Efficiency Video Coding (HEVC) Test Model 2 (HM 2) Encoder Description," JCTVC-D502, Joint Collaborative Team on Video Coding (JCT-VC) of ITU-T SG16 WP3 and ISO/IEC JTC1/SC29/WG11, Guangzhou, C N, Oct. 7-15, 2010, and T. Wiegand, et al., "WD2: Working Draft 2 of High-Efficiency Video Coding," JCTVC-D503, Joint Collaborative Team on Video Coding (JCT-VC) of ITU-T SG16 WP3 and ISO/IEC JTC1/SC29/WG11, Daegu, Korea, Jan. 20-28, 2011 ("WD2"), T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, C H, Mar. 16-23, 2011 ("WD3"), B. Bross, et al., "WD4: Working Draft 4 of High-Efficiency Video Coding, JCTVC-F803_d6, Joint Collaborative Team on Video Coding (JCT-VC) of ITU-T SG16 WP3 and ISO/IEC JTC1/SC29/WG11, Torino, I T, Jul. 14-22, 2011 ("WD4"), B. Bross. et al., "WD5: Working Draft 5 of High-Efficiency Video Coding, JCTVC-G1103_d9, Joint Collaborative Team on Video Coding (JCT-VC) of ITU-T SG16 WP3 and ISO/IEC JTC1/SC29/WG11, Geneva, C H, Nov. 21-30, 2011 ("WD5"), and B. Bross, et al., "High Efficiency Video Coding (HEVC) Text Specification Draft 6, JCTVC-H1003, Joint Collaborative Team on Video Coding (JCT-VC) of ITU-T SG16 WP3 and ISO/IEC JTC1/SC29/WG1, Geneva, C H, Nov. 21-30, 2011 ("HEVC Draft 6"), all of which are incorporated by reference herein.

In HEVC, the minimum PU size is 4×4, i.e., samples in a 4×4 region share a same set of motion data when the PU is inter-predicted, and an inter-predicted PU of a larger size can be treated as a multiple of 4×4 blocks which share the motion data of the PU. For simplicity of the implementation, for advanced motion vector predicator (AMVP) and merging candidate list derivation, the motion data may be populated to the 4×4 block level regardless of PU size. For example, if a neighboring inter-predicted PU is 16×16, the same set of PU motion data is replicated 16 times for the 4×4 blocks of the PU and stored. In this way, the motion data from neighboring 4×4 blocks in the relevant locations can be fetched to derive the AMVP or merging candidates without the need to know the actual neighboring PU sizes to compute the motion data location. In WD3, WD4, and WD5, the motion data is populated to sample (pixel) level for the simplicity of description. In actual implementation, such a motion data storage format, i.e., sample-based, may not be used due to memory usage considerations. In the description herein, the various motion data blocks specify the locations from which the neighboring motion data, both spatial and temporal, should be fetched. The encoder or decoder has the responsibility to determine which PU contains a motion data block and to fetch the PU motion data accordingly. The simplest way to realize this functionality, and to avoid an on-the-fly computation, is to store the motion data for a PU at the 4×4 block level once motion data is determined for that PU.

Figure 2:
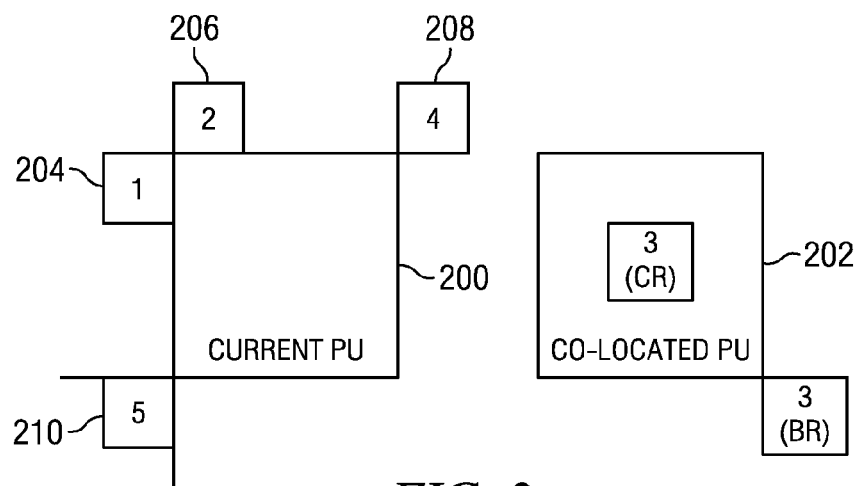
FIG. 2 is a block diagram illustrating prior art spatial and temporal motion data positions for constructing a merging candidate list.

In general, merge mode allows an inter-predicted PU to inherit the same motion vector(s), prediction direction, and a reference picture index (or indices) from an inter-predicted PU which contains a motion data position selected from a group of spatially neighboring motion data positions and one of two temporally co-located motion data positions. FIG. 2 illustrates candidate motion data positions for the merge mode as defined in WD3. For the current PU 200, the encoder forms a merging candidate list by considering merging candidates from the motion data positions depicted in FIG. 2: four spatially neighboring motion data (SMD) positions, i.e., a left neighboring SMD position 204, an upper neighboring SMD position 206, an upper right neighboring SMD position 208, and a bottom left neighboring SMD position 210, and two temporal motion data (TMD) positions of the a temporally co-located PU 202.

To choose the co-located temporal merging candidate, the co-located temporal motion data from the bottom right TMD position (see 3 (BR) in FIG. 2, outside the co-located PU 202) is first checked and selected for the temporal merging candidate if available. Otherwise, the co-located temporal motion data at the upper left central TMD position (see 3 (CR) in FIG. 2) is checked and selected for the temporal merging candidate if available. To derive the motion data for a merging candidate from a motion data position, the needed motion data is copied from the corresponding PU which contains (or covers) the motion data position. The merging candidates in the list, if available, are ordered in the merging candidate list as numbered in FIG. 2, with the merging candidate from the left neighboring SMD position 204 placed at the beginning of the list, the temporal merging candidate from the TMD position bottom right to or inside the co-located PU 202, in the third position, and that of the bottom left neighboring SMD position 210 placed at the end of the list. The derivation of the spatially neighboring merging candidates, the temporal neighboring merging candidate, and the criteria for availability are explained in WD3.

A merging candidate includes motion vector information, prediction flag information, and reference picture index information for a candidate motion data position. A merging candidate may include sufficient entries to accommodate a bi-directionally predicted PU, i.e., entries for a forward motion vector, a backward motion vector, a forward reference picture index, a backward reference picture index, and a prediction flag indicating prediction direction, i.e., forward, backward, or bi-directional. The prediction flag may be composed of two prediction list utilization flags used to indicate which of two reference picture lists is to be used. Each reference picture index is an index into a respective one of the reference picture lists. For a motion data position contained by a forward predicted PU, the merging candidate entries for the prediction flag, the forward motion vector, and the forward reference picture index will be valid and the remaining entries may have placeholder values. For a motion data position contained by a backward predicted PU, the merging candidate entries for the prediction flag, the backward motion vector, and the backward reference picture index will be valid and the remaining entries may have placeholder values. For a bi-directionally predicted PU, all merging candidate entries will be valid.

In HEVC, the merging candidate entries may be referred to according to their correspondence with one of two reference picture lists, list 0 and list 1. Thus, the forward motion vector may be referred to as the list 0 (or L0) motion vector, the backward motion vector may be referred to as the list 1 (or L1) motion vector, the two prediction list utilization flags be referred to as the list 0 (or L0) prediction list utilization flag and the list 1 (or L1) prediction list utilization flag, and the reference picture indices may be referred to as the list 0 (or L0) reference picture index and the list 1 (or L1) reference picture index.

After the merging candidate list is formed, a pruning process is carried out to remove any duplicated merging candidates. If two or more merging candidates have the same motion vector(s), prediction direction, and reference picture index (or indices), the lowest order duplicated merging candidate is retained in the list and the others are removed. If all the merging candidates are not valid, zero motion vector merging candidates are added to the merging candidate list. Therefore, the merging candidate list size for merge mode may be of size 1, 2, 3, 4 or 5. Invalidity of a merging candidate for merge mode is explained in WD3.

In general, skip mode allows the encoder to "skip" coding of an inter-predicted CU when it can be effectively inter-predicted from motion data of a neighboring PU or a temporally co-located CU. More specifically, skip mode allows an inter-predicted CU to inherit the motion data of a spatial or temporal neighbor, and no non-zero quantized transform coefficients are encoded for the CU. Skip mode is determined at the CU level and is essentially a merge mode at the CU-level without non-zero transform coefficients. Thus, for skip mode, the encoder generates a merging candidate list as previously described except that the current PU is a CU. The same relative positions for the spatial merging candidates and the temporal merging candidate are used. A merging candidate for skip mode also contains the same information as previously described for a merging candidate.

In general, for direct or normal inter-prediction, motion vector(s) of a PU is (are) predicatively coded relative to a motion vector predictor(s) (MVP(s)) from an advanced motion vector predictor (AMVP) candidate list constructed by the encoder. For single direction inter-prediction of a PU, the encoder generates a single AMVP candidate list. For bi-directional prediction of a PU, the encoder generates two AMVP candidate lists, one using motion data of spatial and temporal neighboring PUs from the forward prediction direction and one using motion data of spatial and temporal neighboring PUs from the backward prediction direction.

Figure 3:
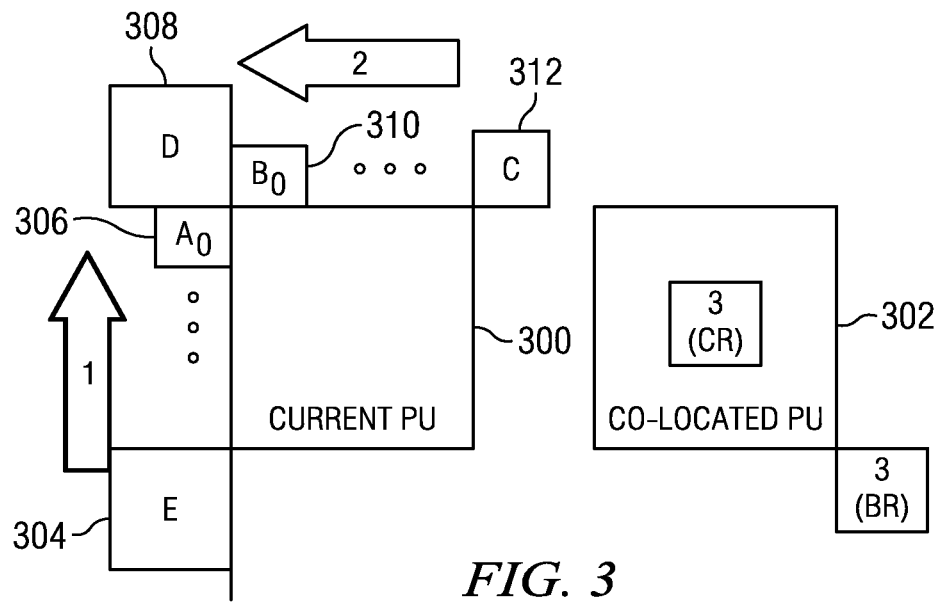
FIG. 3 is a block diagram of illustrating prior art spatial and temporal motion data positions for constructing an advanced motion vector predictor (AMVP) candidate list.

FIG. 3 illustrates the formation of an AMVP candidate list for the current PU 300 as defined in WD3. The encoder forms an AMVP candidate list based on neighboring SMD positions and TMD positions of a co-located PU 302 as illustrated in the example of FIG. 3. The motion vectors for a motion data position are selected as an MVP from the motion data of the corresponding PU which contains (covers) the motion data position. For the spatial MVP candidate derivation, the SMD positions to the left of the current PU 300 are scanned bottom up, e.g., from the bottom left SMD position 304 to the left top SMD position 306, and the motion vector of the first SMD position on the left side having available motion data is chosen to be the first candidate MVP for the AMVP candidate list. Then, the upper side neighboring SMD positions are scanned left to right, e.g., from the top right SMD position 312, through the left top SMD position 310, ending with the top left SMD position 308. The motion vector of the first SMD position on the upper neighboring side having available motion data with a motion vector of a different value from the first candidate MVP is chosen as the second candidate MVP in the AMVP candidate list. If no spatial MVP candidate is found during the scan of the left-side SMD positions, then up to two MVP candidates may be selected from the top-side SMD positions. That is, the first available motion vector of the upper left side is chosen as the first candidate MVP in the AMVP candidate list and the second available motion vector different from the first is chosen as the second candidate MVP in the AMVP candidate list.

To chose the temporal candidate MVP, the availability of motion data from the bottom right TMD position of the co-located PU 302 (see 3 (BR) in FIG. 3, outside the co-located PU 202) is first checked and the motion vector selected for the temporal candidate MVP if available. Otherwise, the availability of motion data at the upper left central TMD position of the co-located PU 302 (see 3 (CR) in FIG. 3) is checked and the motion vector selected for the temporal candidate MVP if available. Note that this is essentially the same derivation process as that used to select the temporal merging candidate in the merging candidate list derivation process. The temporal MVP candidate is added to the AMVP candidate list in the third position. The derivation of the spatial MVP candidates, the temporal MVP candidate, and the criteria for availability for the AMVP candidate list are explained in WD3.

If no candidate MVPs are found in the scans of the left/upper SMD positions and from co-located temporal PU, a zero MVP is added to the AMVP candidate list. After the AMVP candidate list is formed, a pruning process similar to that used in pruning the merging candidate list is carried out to remove any duplicated MVP candidates. Therefore, the AMVP candidate list size may be 1, 2, or 3.

Figure 4:
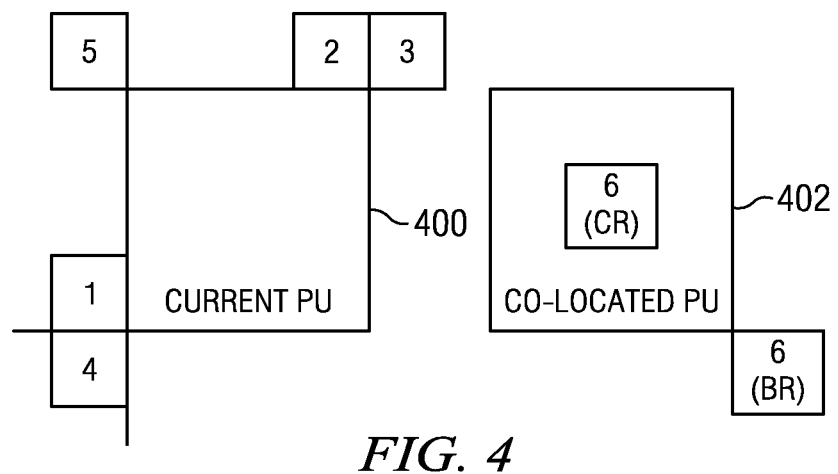
FIG. 4 is a block diagram illustrating spatial and temporal motion data positions for constructing a merging candidate list and an AMVP candidate list.

In WD4, WD5, and HEVC Draft 6, the derivation of the merging candidate list and the AMVP candidate list was changed to use the same SMD positions in constructing each list. The co-located PU and the relative TMD positions remained the same. FIG. 4 shows the five SMD positions of the current PU 400 and the temporally co-located PU 402. For the merging candidate list, the merging candidates, if available, are ordered in the list as per the numbering in FIG. 4. For the AMVP candidate list, the MVPs of the motion data positions, if available, are ordered in the list as per the numbering in FIG. 4. Pruning of the lists and the addition of zero motion vector merging candidates or zero MVPs to the respective lists is as previously described. The derivation of the spatial candidates, the temporal candidate, and the criteria for availability for each list are explained in WD4, WD5, and HEVC Draft 6.

In general, for a CU, the encoder generates a merging candidate list for skip mode, a merging candidate list for each PU in the CU, and one or two AMVP candidate lists for each PU in the CU. The encoder then uses the best candidates in each list in the determination of rate/distortion (RD) costs for using each mode. For each PU, the encoder selects the better mode between merge and normal inter-predicted mode based on the RD costs. The sum of the costs for the selected modes for all PUs in the CU is the RD cost for the CU for inter-predicted mode, i.e., non-skipped and non-intra coded mode. At the CU level, the encoder chooses the best mode among skip mode, inter-predicted mode, and Intra-predicted mode based on the RD costs of each.

For each inter-predicted CU, the encoder encodes a skip flag into the bit stream to signal whether or not the current CU is coded with skip mode. If skip mode is used, the encoder also encodes the index in the merging candidate list generated for skip mode of the merging candidate selected (unless there is only one entry in the list). If skip mode is not used for the CU and intra-prediction is not selected, the encoder encodes a merge flag into the bit stream for each inter-predicted PU of the CU to signal whether or not the merge mode is used for the PU. If merge mode is used, the encoder also encodes the index in the merging candidate list of the merging candidate selected for merging (unless there is only one entry in the list). If merge mode is not used, the encoder encodes the normal inter-prediction information for the PU in the bit-stream such as an index (or indices) into the AMVP candidate list(s) for the MVP candidate(s) selected for differential encoding of the motion vector(s), prediction direction(s), motion vector differences (MVDs), and the reference picture index (or indices).

The decoder is also required to construct a merging candidate list, and/or up to two AMVP candidate lists when decoding an inter-predicted PU, depending upon which mode was used for inter-prediction in the encoder, and a merging candidate list for an inter-predicted CU when skip mode was used by the encoder. The construction of these lists is the same as that performed in the encoder.

As has been explained, the derivation of the temporal merging candidate and the temporal MVP candidate is the same except for the amount of motion data used for a candidate, i.e., a temporal MVP candidate uses the motion vector data from the PU covering a motion data position and a temporal merging candidate uses the motion vector data and additional data from the PU covering a motion data position. For simplicity of explanation, the generic term temporal motion data (TMD) candidate is used when the description applies to both of these candidates. Further, the term inter-prediction candidate list used when the description applies to both a merging candidate list and an AMVP candidate list.

Figure 5:
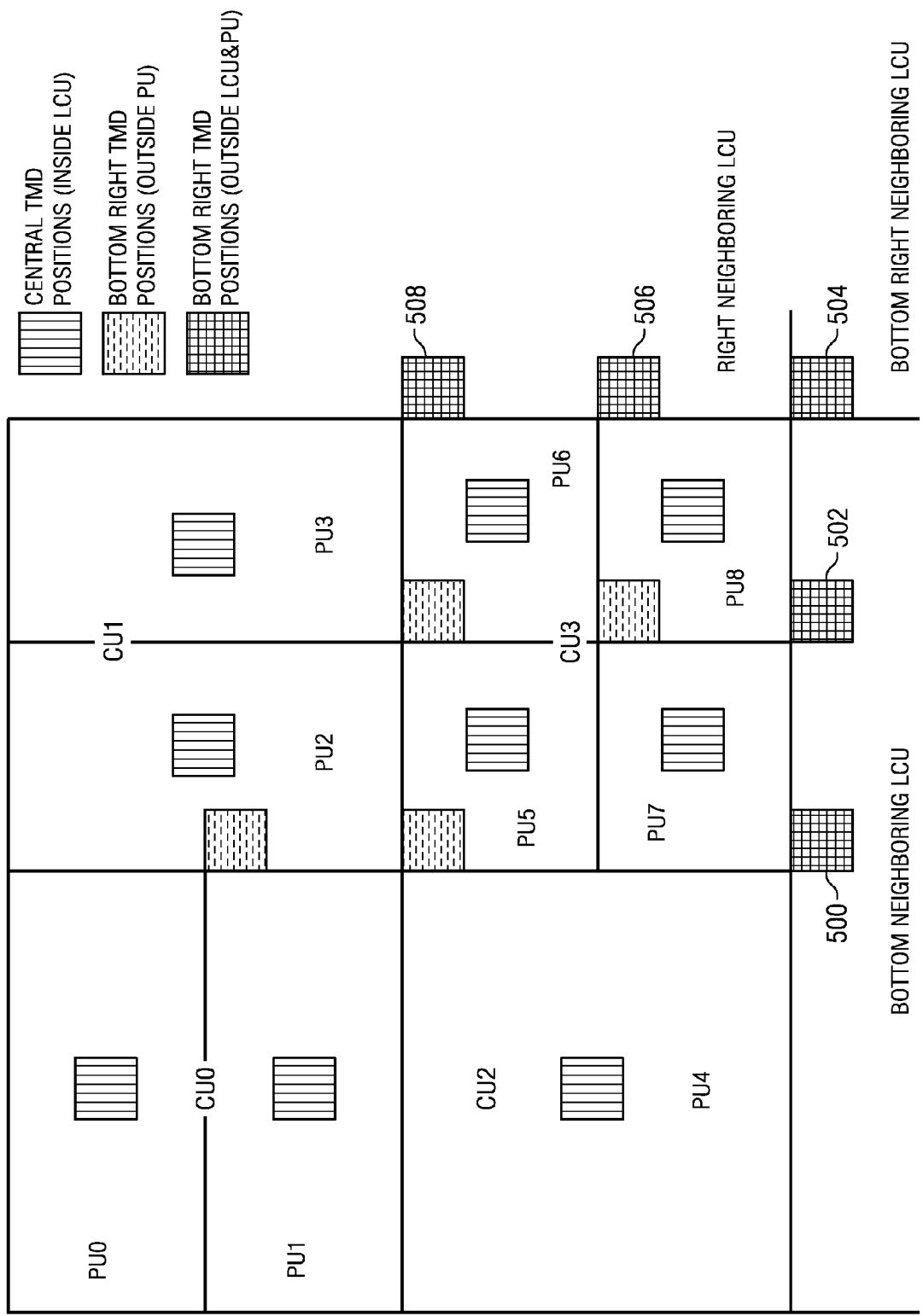
FIG. 5 is an example LCU decomposition showing example temporal motion data positions for PUs of the LCU.

In a practical implementation of an HEVC encoder or decoder, for the derivation of TMD candidates for the current LCU, the temporal motion data (motion vectors, reference picture index, prediction direction, prediction size) needs to be pre-fetched for the entire LCU. Using the derivation of the TMD candidates as previously described, the pre-fetched co-located temporal motion data for the current LCU can cross LCU boundaries in the co-located reference picture. Consider the example of FIG. 5, in which the current LCU is decomposed into four CUs, CU0-CU3, which are further divided into nine PUs of different sizes, PU0-PU8. Because the bottom right (BR) TMD position, which is outside the co-located PU, is used for derivation of the TMD candidate for the current PU, the TMD positions 500, 502, 504, 506, 508 are outside the co-located LCU in the reference picture. Consequently, for the derivation of the TMD candidates for the current LCU, not only the motion data from the co-located LCU but also from its neighboring LCUs, i.e., the right, bottom, and bottom right neighboring LCUs needs to be fetched. In an embedded system implementation of an encoder or decoder, the motion data for reference pictures is stored in off-chip memory. Thus, the need to fetch all of these reference LCUs consumes significant memory bandwidth and cycle overhead.

Figure 6:
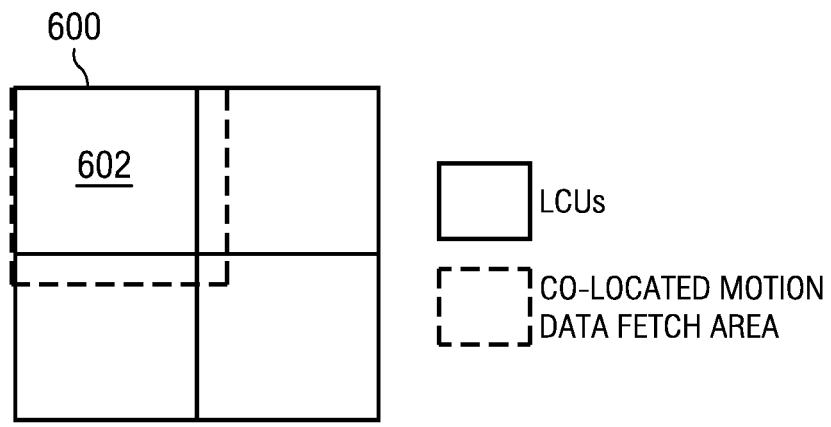
FIG. 6 is an example illustrating temporal motion data fetch area relative to a co-located LCU.

Put another way, the fetch area for the temporal motion data needed for TMD candidate derivation is not aligned with the current LCU. Because of the bottom right (BR) TMD candidate position, this fetch area can go beyond the boundaries of the current LCU. As shown in FIG. 6, an 80×80 co-located motion data area 600 needs to be pre-fetched for a 64×64 LCU 602. The 80×80 co-located area 602 touches motion data of four LCUs in the co-located picture.

HEVC uses motion data compression to decrease memory bandwidth. To ensure memory burst alignments and avoid page crossing, thus minimizing memory bandwidth requirements, compression, storage, and fetching of motion data in 64×64 LCU aligned tile format is desirable. As shown in Table 1, after compression, the motion data size for each 16×16 block area is about 74 bits which is approximately 10 bytes. For a 64×64 LCU, the total motion data after compression is about 148 bytes, which is approximately 19, 10, and 5 bursts for a memory burst size of 8, 16, and 32 bytes, respectively.

TABLE 1

| Motion data | Size of data after compression for 16 × 16 block (bits) |
| --- | --- |
| Motion vectors | 64 (2 × 2 × 16) |
| Intra/inter flag + Prediction direction | 2 |
| Ref_idx | 8 (2 × 4) |
| Total for 16 × 16 (bits) | 74 (bits) = ~10 (bytes) |
| Total for 64 × 64 LCU (bytes) | 148 (bytes) |

If the motion data is compressed and stored in 64×64 LCU aligned tile format, motion data from four LCUs in the co-located picture is fetched for the derivation of TMD candidates of the current LCU, thus incurring high memory bandwidth. One solution to lower the memory bandwidth is to add a line buffer to maintain the co-located motion data for the previous LCU row, so that the motion data can be re-used by the TMD candidate derivation process of the current LCU row. However, such a solution is expensive.

Embodiments of the invention provide for derivation of TMD candidates that resolve the misalignment issue. More specifically, some embodiments provide an alternative TMD candidate derivation in which the TMD positions are constrained to be within the boundaries of the co-located LCU row. Other embodiments provide an alternative TMD derivation in which the TMD positions are constrained to be within the boundaries of the co-located LCU.

Figure 7:
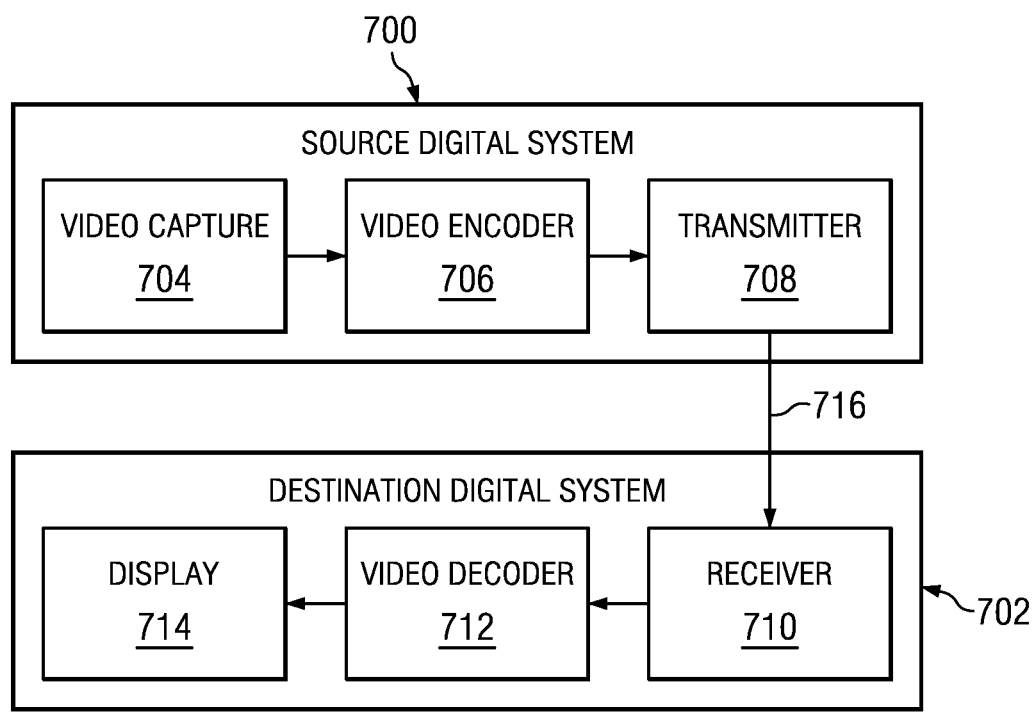
FIG. 7 is a block diagram of an example digital system.

FIG. 7 shows a block diagram of a digital system that includes a source digital system 700 that transmits encoded video sequences to a destination digital system 702 via a communication channel 716. The source digital system 700 includes a video capture component 704, a video encoder component 706, and a transmitter component 708. The video capture component 704 is configured to provide a video sequence to be encoded by the video encoder component 706. The video capture component 704 may be, for example, a video camera, a video archive, or a video feed from a video content provider. In some embodiments, the video capture component 704 may generate computer graphics as the video sequence, or a combination of live video, archived video, and/or computer-generated video.

The video encoder component 706 receives a video sequence from the video capture component 704 and encodes it for transmission by the transmitter component 708. The video encoder component 706 receives the video sequence from the video capture component 704 as a sequence of pictures, divides the pictures into largest coding units (LCUs), and encodes the video data in the LCUs. The video encoder component 706 may be configured to perform temporal motion data (TMD) candidate derivation during the encoding process as described herein. An example of the video encoder component 706 is described in more detail herein in reference to FIG. 8.

The transmitter component 708 transmits the encoded video data to the destination digital system 702 via the communication channel 716. The communication channel 716 may be any communication medium, or combination of communication media suitable for transmission of the encoded video sequence, such as, for example, wired or wireless communication media, a local area network, or a wide area network.

The destination digital system 702 includes a receiver component 710, a video decoder component 712 and a display component 714. The receiver component 710 receives the encoded video data from the source digital system 700 via the communication channel 716 and provides the encoded video data to the video decoder component 712 for decoding. The video decoder component 712 reverses the encoding process performed by the video encoder component 706 to reconstruct the LCUs of the video sequence. The video decoder component 712 may be configured to perform TMD candidate derivation during the decoding process as described herein. An example of the video decoder component 712 is described in more detail below in reference to FIG. 9.

The reconstructed video sequence is displayed on the display component 714. The display component 714 may be any suitable display device such as, for example, a plasma display, a liquid crystal display (LCD), a light emitting diode (LED) display, etc.

In some embodiments, the source digital system 700 may also include a receiver component and a video decoder component and/or the destination digital system 702 may include a transmitter component and a video encoder component for transmission of video sequences both directions for video steaming, video broadcasting, and video telephony. Further, the video encoder component 706 and the video decoder component 712 may perform encoding and decoding in accordance with one or more video compression standards. The video encoder component 706 and the video decoder component 712 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 8:
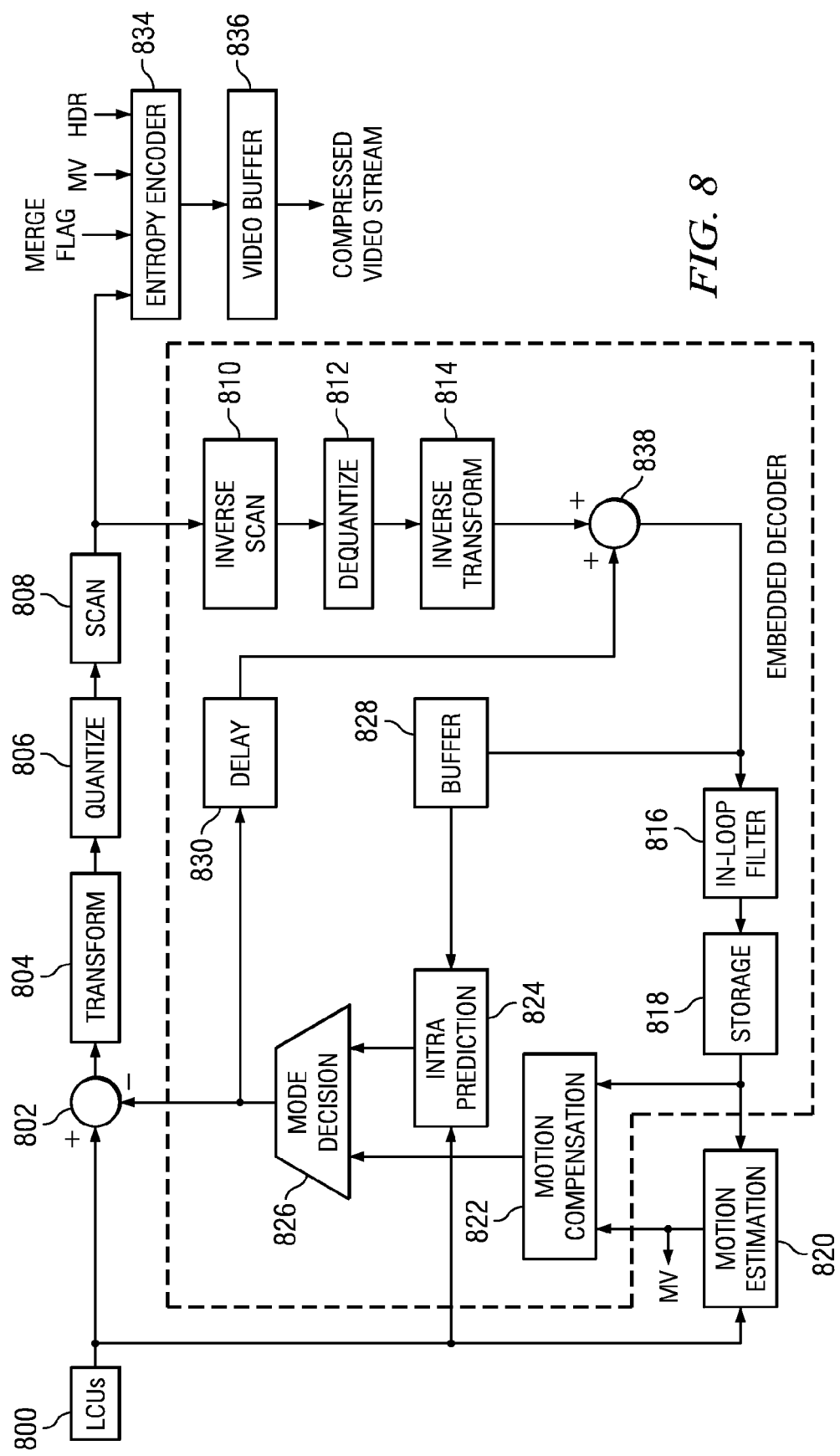
FIG. 8 is a block diagram of a video encoder.

FIG. 8 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial PU and TU structure for each CU and provides information regarding this initial structure to the various components of the video encoder as needed.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 800 from the coding control unit are provided as one input of a motion estimation component 820, as one input of an intra-prediction component 824, and to a positive input of a combiner 802 (e.g., adder or subtractor or the like). Further, although not specifically shown, the prediction mode of each picture as selected by the coding control component is provided to a mode selector component and the entropy encoder 834.

The storage component 818 provides reference data to the motion estimation component 820 and to the motion compensation component 822. The reference data may include one or more previously encoded and decoded CUs, i.e., reconstructed CUs.

The motion estimation component 820 provides motion data information to the motion compensation component 822 and the entropy encoder 834. More specifically, the motion estimation component 820 performs tests on CUs in an LCU based on multiple inter-prediction modes (e.g., skip mode, merge mode, and normal or direct inter-prediction) and transform block sizes using reference picture data from storage 818 to choose the best motion vector(s)/prediction mode based on a rate distortion coding cost. To perform the tests, the motion estimation component 820 may begin with the CU structure provided by the coding control component. The motion estimation component 820 may divide each CU indicated in the CU structure into PUs according to the unit sizes of prediction modes and into transform units according to the transform block sizes and calculate the coding costs for each prediction mode and transform block size for each CU. The motion estimation component 820 may also compute CU structure for the LCU and PU/TU partitioning structure for a CU of the LCU by itself.

As mentioned above, the prediction modes considered by the motion estimation component 820 may be merge mode, skip mode, and regular (normal) inter-prediction mode. To consider skip mode, the motion estimation component 820 constructs a skip mode merging candidate list at the CU level. To consider merge mode, the motion estimation component 820 constructs a merging candidate list for each PU in the CU. To consider regular inter-prediction mode, the motion estimation component 820 estimates motion vectors and constructs one or two AMVP candidate lists (depending on prediction direction) for each PU. For simplicity of explanation, the SMD positions and the ordering of the merging candidates in the merging candidate list and the AMVP candidate list are assumed to be as shown in FIG. 4. The derivation of the spatial merging candidates, the spatial MVP candidates, and the criteria for availability may be as described in WD4, WD5, or HEVC Draft 6. One of ordinary skill in the art will understand that different SMD positions, different derivations, and/or different ordering may be used. The derivation of the temporal merging candidate for each candidate list may be performed as per methods described herein.

For each PU of a CU, the motion estimation component 820 computes coding costs for each entry in the merging candidate list and selects the entry with the best result. The coding cost of this entry is used by the motion estimation component 820 in prediction mode selection. For each PU of the CU, the motion estimation component 820 determines the best motion vectors and MVP(s) from the AMVP candidate list(s) based on coding costs, and uses the best coding cost for prediction mode selection. For each PU in the CU, the motion estimation component selects the better of merge mode and normal inter-predicted mode based on the coding costs. The sum of the costs of the selected modes for all PUs in the CU is the RD cost for the CU in inter-predicted mode. For the CU, the motion estimation component 820 also computes coding costs for each entry in the skip mode merging candidate list and selects the entry with the best result. The coding cost of this entry is used by the motion estimation component 820 in prediction mode selection between CU-level skip mode and normal inter-predicted mode.

For coding efficiency, the motion estimation component 820 may also decide to alter the CU structure by further partitioning one or more of the CUs in the CU structure. That is, when choosing the best motion vectors/prediction modes, in addition to testing with the initial CU structure, the motion estimation component 820 may also choose to divide the larger CUs in the initial CU structure into smaller CUs (within the limits of the recursive quadtree structure), and calculate coding costs at lower levels in the coding hierarchy. If the motion estimation component 820 changes the initial CU structure, the modified CU structure is communicated to other components that need the information.

The motion estimation component 820 provides the selected motion vector (MV) or vectors and the selected prediction mode for each inter-predicted PU of a CU to the motion compensation component 822 and the selected motion vector (MV), reference picture index (indices), prediction direction (if any) to the entropy encoder 834. If merge mode or skip mode provides the best motion vector(s)/prediction mode for a PU or CU based on a coding cost, the motion estimation component 820 also indicates to the entropy encoder 834 to encode a merge (skip) flag indicating that merge (skip) mode is used for a PU (CU) and to encode an index into the merging candidate list for the entry that provided the best coding cost. The index may not be encoded if the candidate list size is one; instead it is inferred to be 0.

If merge mode did not provide the best coding cost for an inter-predicted PU, the motion estimation component 820 indicates to the entropy encoder 834 to encode a merge flag indicating that merge mode was not used for the PU. A merge flag is encoded for each inter-predicted PU unless skip mode is selected for the CU containing the PU. Further, if normal inter-prediction mode provided the best coding cost, the motion estimation component 820 indicates to the entropy encoder 834 to encode an index (or indices) into the AMVP candidate list(s) for the MVP candidate(s) used for differential prediction of the motion vector(s).

The motion compensation component 822 provides motion compensated inter-prediction information to the mode decision component 826 that includes motion compensated inter-predicted PUs, the selected inter-prediction modes for the inter-predicted PUs, and corresponding transform block sizes. The coding costs of the inter-predicted PUs are also provided to the mode decision component 826.

The intra-prediction component 824 provides intra-prediction information to the mode decision component 826 that includes intra-predicted PUs and the corresponding intra-prediction modes. That is, the intra-prediction component 824 performs intra-prediction in which tests based on multiple intra-prediction modes and transform unit sizes are performed on CUs in an LCU using previously encoded neighboring PUs from the buffer 828 to choose the best intra-prediction mode for each PU in the CU based on a coding cost. To perform the tests, the intra-prediction component 824 may begin with the CU structure provided by the coding control. The intra-prediction component 824 may divide each CU indicated in the CU structure into PUs according to the unit sizes of the intra-prediction modes and into transform units according to the transform block sizes and calculate the coding costs for each prediction mode and transform block size for each PU.

For coding efficiency, the intra-prediction component 824 may also decide to alter the CU structure by further partitioning one or more of the CUs in the CU structure. That is, when choosing the best prediction modes, in addition to testing with the initial CU structure, the intra-prediction component 824 may also chose to divide the larger CUs in the initial CU structure into smaller CUs (within the limits of the recursive quadtree structure), and calculate coding costs at lower levels in the coding hierarchy. If the intra-prediction component 824 changes the initial CU structure, the modified CU structure is communicated to other components that need the information. Further, the coding costs of the intra-predicted PUs and the associated transform block sizes are also provided to the mode decision component 826.

The mode decision component 826 selects between the motion-compensated inter-predicted PUs from the motion compensation component 822 and the intra-predicted PUs from the intra-prediction component 824 based on the coding costs of the PUs and the picture prediction mode provided by the mode selector component. The decision is made at CU level. Based on the decision as to whether a CU is to be intra- or inter-coded, the intra-predicted PUs or inter-predicted PUs are selected, accordingly. The output of the mode decision component 826, i.e., the predicted PU, is provided to a negative input of the combiner 802 and to a delay component 830. The associated transform block size is also provided to the transform component 804. The output of the delay component 830 is provided to another combiner (i.e., an adder) 838. The combiner 802 subtracts the predicted PU from the current PU to provide a residual PU to the transform component 804. The resulting residual PU is a set of pixel difference values that quantify differences between pixel values of the original PU and the predicted PU. The residual blocks of all the PUs of a CU form a residual CU block for the transform component 804.

The transform component 804 performs block transforms on the residual CU to convert the residual pixel values to transform coefficients and provides the transform coefficients to a quantize component 806. The transform component 804 receives the transform block sizes for the residual CU and applies transforms of the specified sizes to the CU to generate transform coefficients.

The quantize component 806 quantizes the transform coefficients based on quantization parameters (QPs) and quantization matrices provided by the coding control component and the transform sizes. The quantized transform coefficients are taken out of their scan ordering by a scan component 808 and arranged by significance, such as, for example, beginning with the more significant coefficients followed by the less significant.

The ordered quantized transform coefficients for a CU provided via the scan component 808 along with header information for the CU are coded by the entropy encoder 834, which provides a compressed bit stream to a video buffer 836 for transmission or storage. The header information may include the prediction mode used for the CU. If the CU uses merge mode, and all the transform coefficients after quantization are all zero, the CU is coded with skip mode, a skip flag equal to one is encoded into bit stream, and an index into the merging candidate list for the merging candidate used for the skip mode is also encoded unless the size of the merging candidate list is one. Otherwise, a merge flag is encoded for each PU of the CU unless the CU is intra-coded. Further, if merge mode is the actual mode selected for prediction of a PU, an index into the merging candidate list for the merging candidate used for prediction of the PU is also encoded unless the size of the merging candidate list is one. Otherwise, if a PU is encoded with normal or regular inter-predicted mode, motion data for the PU, including motion vector difference, reference picture index (indices), prediction direction flag, and an index (two indices) into the AMVP candidate lists for the PU, is encoded into bit stream. The entropy encoder 834 also encodes the CU and PU structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 808 are returned to their original post-transform arrangement by an inverse scan component 810, the output of which is provided to a dequantize component 812, which outputs a reconstructed version of the transform result from the transform component 804.

The dequantized transform coefficients are provided to the inverse transform component 814, which outputs estimated residual information which represents a reconstructed version of a residual CU. The inverse transform component 814 receives the transform block size used to generate the transform coefficients and applies inverse transform(s) of the specified size to the transform coefficients to reconstruct the residual values.

The reconstructed residual CU is provided to the combiner 838. The combiner 838 adds the delayed selected CU to the reconstructed residual CU to generate an unfiltered reconstructed CU, which becomes part of reconstructed picture information. The reconstructed picture information is provided via a buffer 828 to the intra-prediction component 824 and to an in-loop filter component 816. The in-loop filter component 816 applies various filters to the reconstructed picture information to improve the reference picture used for encoding/decoding of subsequent pictures. The in-loop filter component 816 may, for example, adaptively apply low-pass filters to block boundaries according to the boundary strength to alleviate blocking artifacts causes by the block-based video coding. The filtered reference data is provided to storage component 818.

Figure 9:
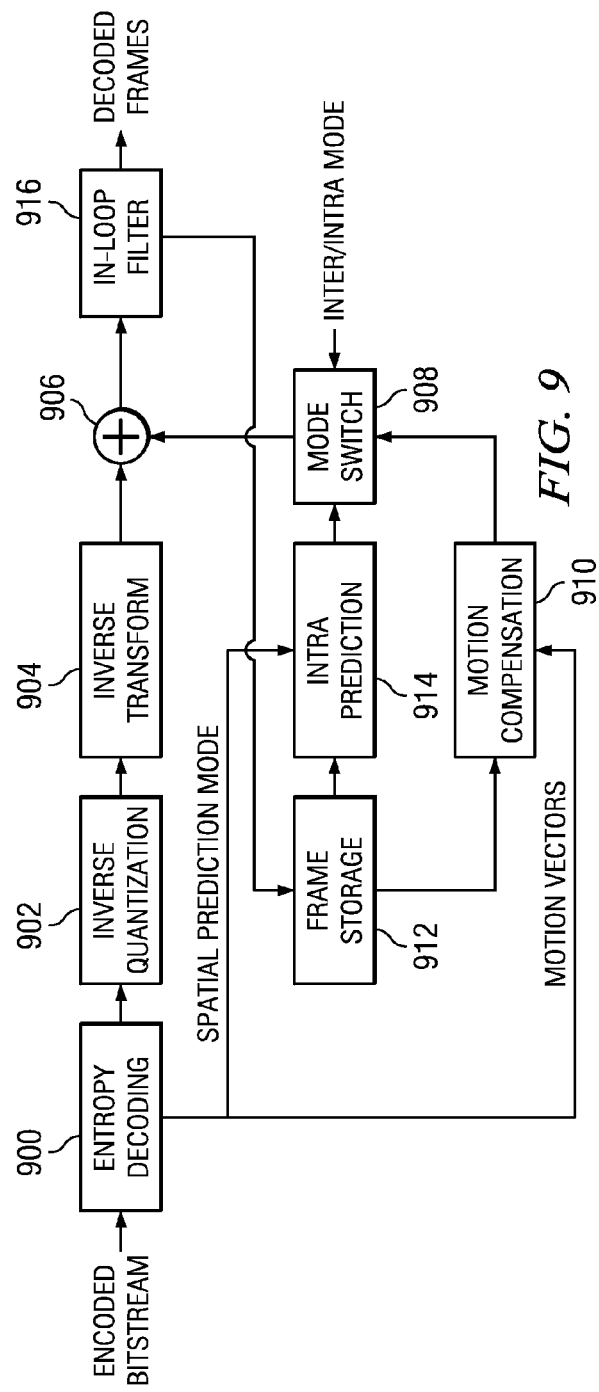
FIG. 9 is a block diagram of a video decoder.

FIG. 9 shows a block diagram of an example video decoder. The video decoder operates to reverse the encoding operations, i.e., entropy coding, quantization, transformation, and prediction, performed by the video encoder of FIG. 8 to regenerate the pictures of the original video sequence. In view of the above description of a video encoder, one of ordinary skill in the art will understand the functionality of components of the video decoder without detailed explanation.

The entropy decoding component 900 receives an entropy encoded (compressed) video bit stream and reverses the entropy coding to recover the encoded PUs and header information such as the prediction modes and the encoded CU and PU structures of the LCUs, skip flags, merge flags, merge indices, etc. For each inter-predicted PU, unless skip mode is indicated, the entropy decoding component 900 decodes a merge flag from the bit stream. If the merge flag indicates that merge mode was not selected for the PU, the entropy decoding component 900 constructs an AMVP candidate list(s) for the PU and decodes a reference picture index (or indices), MVDs (motion vector difference), and an index (or indices) into the AMVP candidate list(s) for the PU. Construction of an AMVP candidate list is previously described in reference to the encoder of FIG. 8. The entropy decoder 900 then reconstructs the motion vector(s) according to the indicated AMVP candidate(s) and the decoded MVDs and provides the motion vector(s) and reference picture index (or indices) to the motion compensation component 910.

If the merge flag indicates that merge mode was used for the PU in the encoder, the entropy decoding component 900 constructs a merging candidate list for the PU and decodes an index into the merging candidate list from the bit stream, if the index is in the bit stream. If no index is present, the index is assumed to be zero. Construction of the merging candidate list is previously described in reference to the encoder of FIG. 8. The entropy decoder provides the motion vector(s) and reference picture index (or indices) from the indicated merging candidate in the merging candidate list to the motion compensation component 910.

If skip mode is indicated, the entropy decoding component 900 constructs a merging candidate list for the CU and decodes an index into the merging candidate list from the bit stream, if the index is in the bit stream. If no index is present, the index is assumed to be zero. Construction of the merging candidate list for skip mode is previously described in reference to the encoder of FIG. 8. The entropy decoder provides the motion vector(s) and reference picture index (or indices) from the indicated merging candidate in the merging candidate list for skip mode to the motion compensation component 910.

The inverse quantization component 902 de-quantizes the quantized transform coefficients of the residual CU. The inverse transform component 904 transforms the frequency domain data from the inverse quantization component 902 back to the residual CU. That is, the inverse transform component 904 applies an inverse unit transform, i.e., the inverse of the unit transform used for encoding, to the de-quantized residual coefficients to produce the residual CUs.

A residual CU supplies one input of the addition component 906. The other input of the addition component 906 comes from the mode switch 908. When an inter-prediction mode is signaled in the encoded video stream, the mode switch 908 selects predicted PUs from the motion compensation component 910 and when an intra-prediction mode is signaled, the mode switch selects predicted PUs from the intra-prediction component 914.

The motion compensation component 910 receives reference data from storage 912 and applies the motion compensation computed by the encoder and transmitted in the encoded video bit stream to the reference data to generate a predicted PU. That is, the motion compensation component 910 uses the motion vector(s) from the entropy decoder 900 and the reference data to generate a predicted PU.

The intra-prediction component 914 receives reference data from previously decoded PUs of a current picture from the picture storage and applies the intra-prediction computed by the encoder as signaled by the intra-prediction mode transmitted in the encoded video bit stream to the reference data to generate a predicted PU.

The addition component 906 generates a decoded CU by adding the predicted PUs selected by the mode switch 908 and the residual CU. The output of the addition component 906 supplies the input of the in-loop filter component 916. The in-loop filter component 916 performs the filtering as the encoder. The output of the in-loop filter component 916 is the decoded pictures of the video bit stream. Further, the output of the in-loop filter component 916 is stored in storage 912 to be used as reference data.

Figure 10:
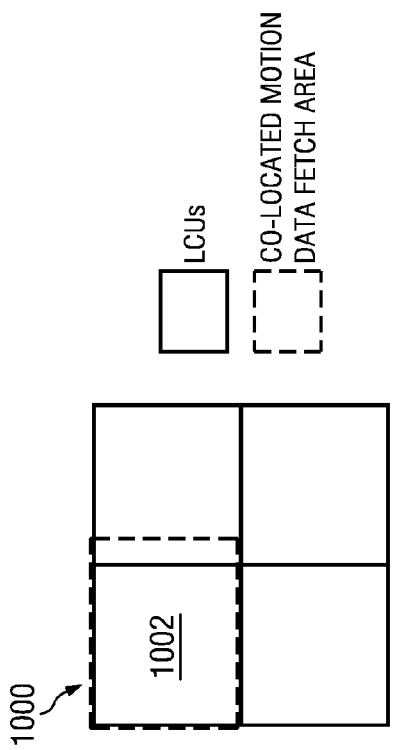
FIG. 10 is an example illustrating a temporal motion data fetch area relative to a co-located LCU when temporal motion data positions are constrained to an LCU row.

Methods for derivation of a temporal motion data (TMD) candidate are now described. These methods may be used as part of the construction of an inter-prediction candidate list, i.e., a merging candidate list or an AMVP list, in both an encoder and a decoder. The methods of FIGS. 11-15 provide TMD candidate derivation in which the TMD positions are constrained to be within the boundaries of the co-located LCU row. That is, the fetch area for temporal motion data can go beyond the right boundary of the co-located LCU into the right neighboring LCU but may not extend into the bottom neighboring or right bottom neighboring LCU in the next LCU row. As is illustrated in FIG. 10, if one of these methods is used, an 80×64 co-located motion data area 1000 needs to be pre-fetched for a 64×64 LCU 1002.

Figure 11:
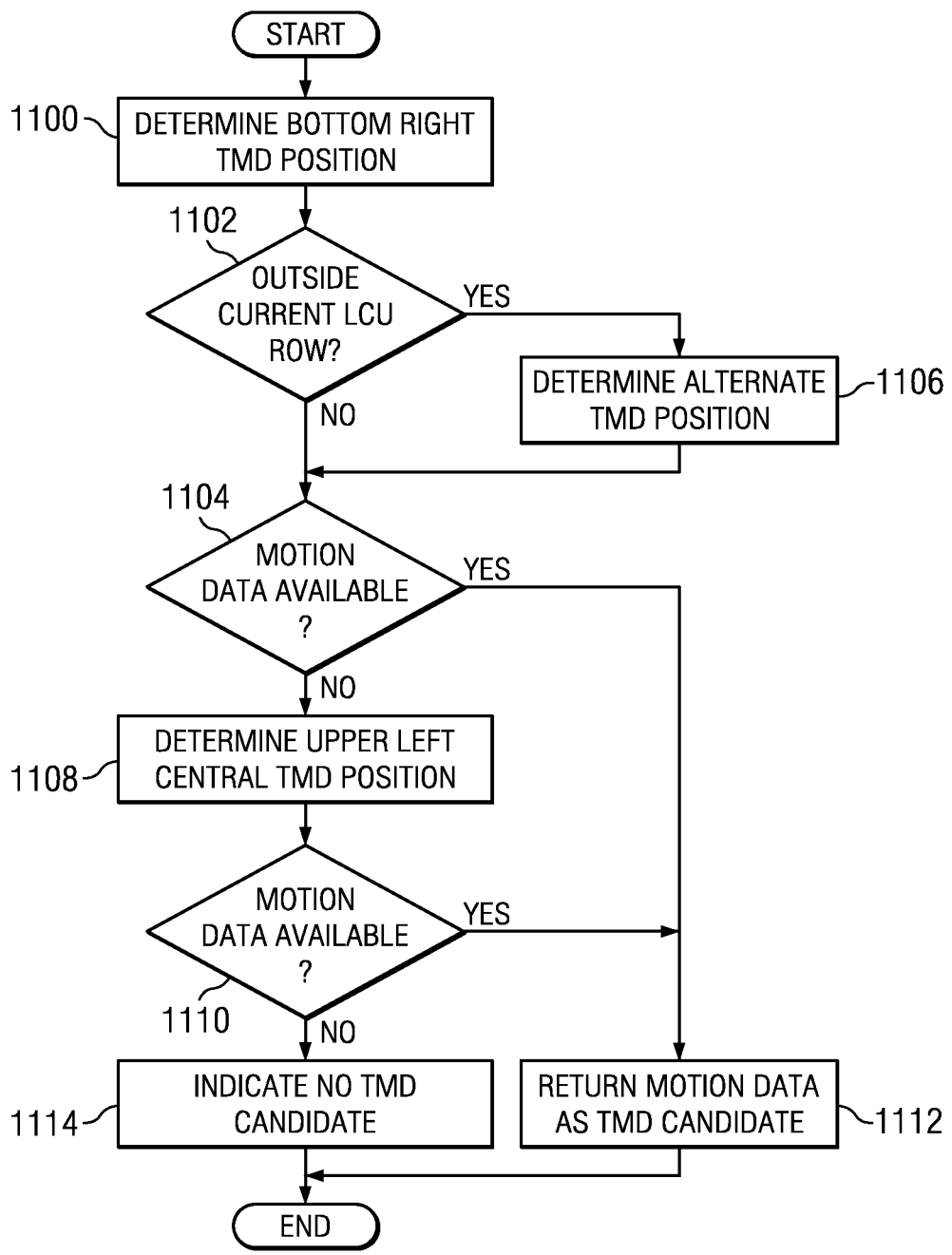
FIGS. 11, 14, 17, 19, 21, and 23 are flow diagrams of methods for temporal motion data derivation in an encoder or decoder.
Figure 12:
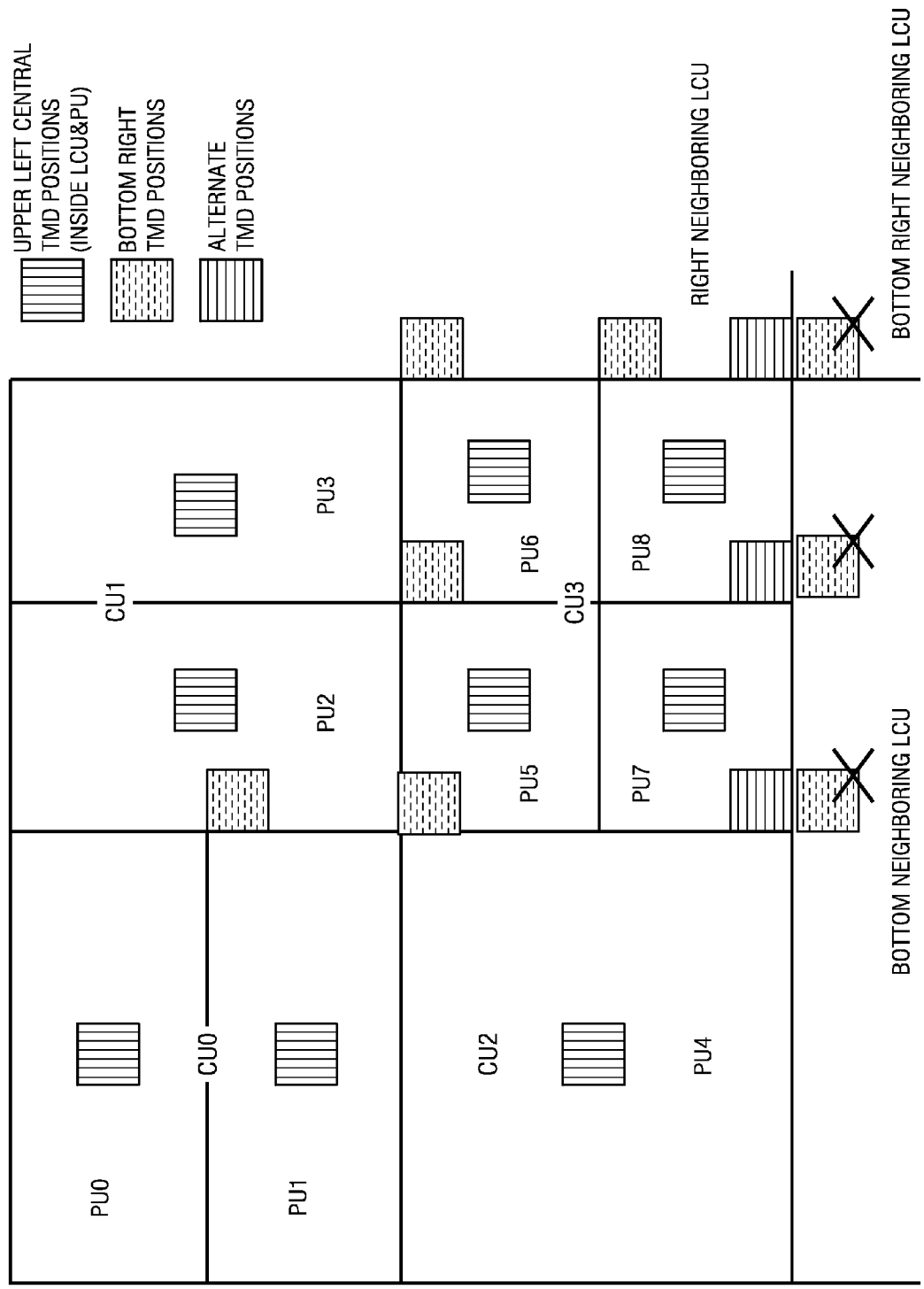
FIGS. 12, 13, 15, 18, 20, 22, and 24 are example LCU decompositions showing example temporal motion data positions for PUs.
Figure 13:
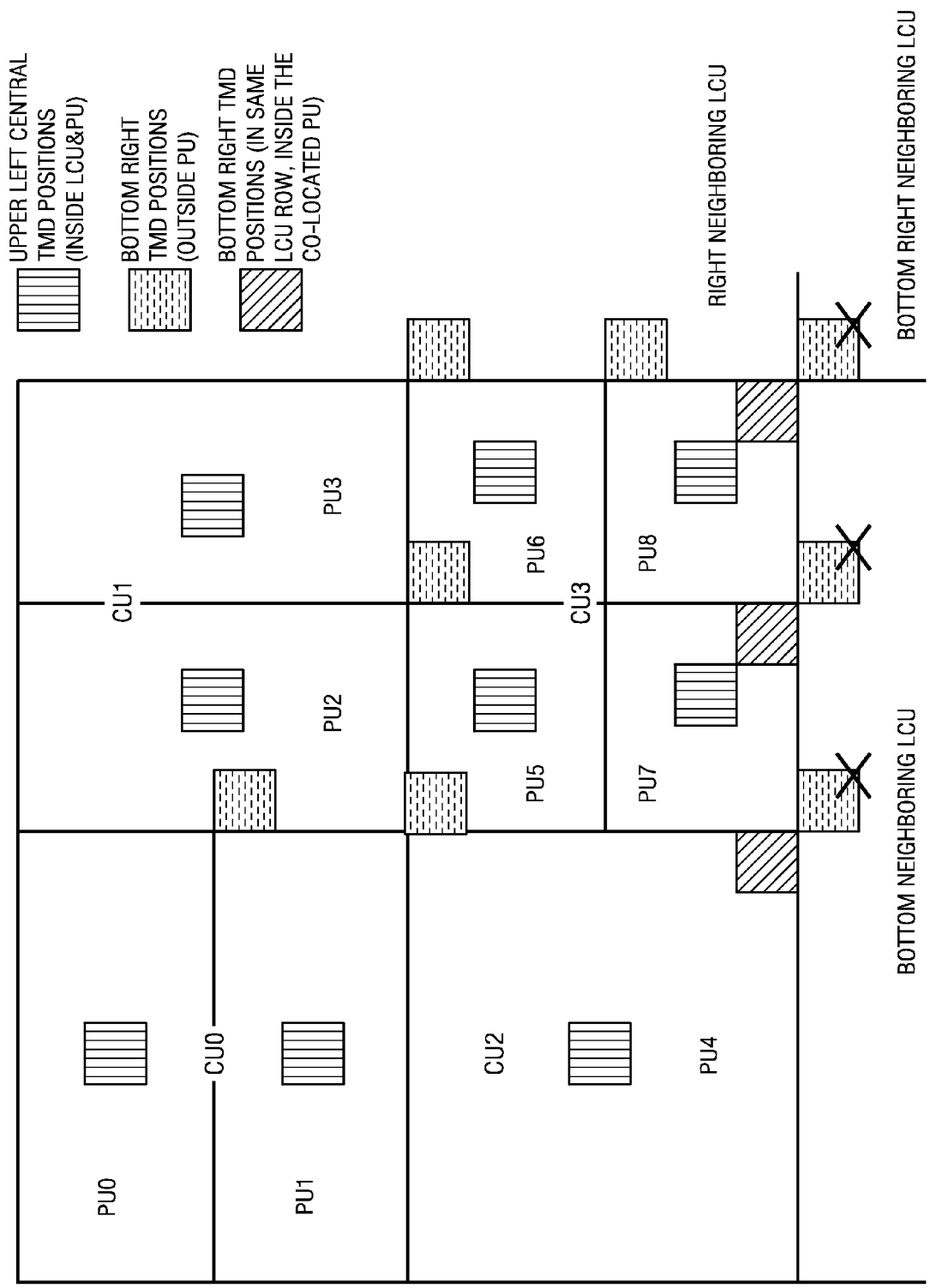

Referring now to the method of FIG. 11, the method uses three TMD positions, a primary TMD position that is the bottom right TMD position outside the co-located PU, a secondary TMD position that is the upper left central TMD position within the co-located PU, and an alternative TMD position that is considered if the primary TMD position is outside the co-located LCU row. In some embodiments, the alternative TMD position may be a bottom right position outside the co-located PU and within the co-located LCU row. FIG. 12 shows an example partitioning of an LCU with this alternative TMD position. In some embodiments, the alternative TMD position may the bottom right position inside the co-located PU. FIG. 13 shows an example partitioning of an LCU with this alternative TMD position.

The TMD positions are defined as follows. Let (xP, yP) be the luminance coordinates of the upper-left corner of the current PU in the current picture, and (puWidth, puHeight) be the size of the current PU. The upper left central TMD position is defined as the luminance sample position in the co-located picture with the coordinates (xP+puWidth/2−1, yP+puHeight/2−1). The bottom right TMD position is defined as the luminance sample position in the co-located picture with the coordinates (xP+puWidth, yP+puHeight). The alternative TMD position of FIG. 12, i.e., the bottom right position outside the co-located PU and within the co-located LCU row, is defined as the luminance sample position in the co-located picture with the coordinates (xP+puWidth, yP+puHeight−1). The alternative TMD position of FIG. 13, i.e., the bottom right position inside the co-located PU, is defined as the luminance sample position in the co-located picture with the coordinates (xP+puWidth−1, yP+puHeight−1). Motion data for a TMD position is copied from the PU in the co-located picture which contains the TMD position.

Referring again to FIG. 11, initially, the primary TMD position, i.e., the bottom right TMD position, is determined 1100. If the position is within the current LCU row 1102, then the availability 1104 of the bottom right TMD motion data is determined. In the examples of FIG. 12 and FIG. 13, the bottom right TMD position is within the current LCU row for PU0, PU1, PU2, PU3, PU5 and PU6. Motion data for a TMD position may not be available, for example, if the PU containing the TMD position was intra-predicted or is outside the current slice or picture. If the motion data for bottom right TMD position is available, the motion data is returned 1112 to be used as the TMD candidate in the inter-prediction candidate list being constructed.

If the bottom right TMD position is outside the current LCU row 1102, then the alternative TMD position is determined 1106. In the examples of FIG. 12 and FIG. 13, the bottom right TMD position is outside the current LCU row for PU4, PU7, and PU8. In some embodiments, the alternative TMD position is the bottom right position outside the co-located PU and within the LCU row as shown in FIG. 12. In some embodiments, the alternative TMD position is the bottom right position inside the co-located PU as shown in FIG. 13. The availability of motion data for the alternative TMD position is then determined 1104. If the motion data is available, the motion data is returned 1112 to be used as the TMD candidate in the inter-prediction candidate list being constructed.

If the motion data of the bottom right TMD position or the alternative TMD position (if considered), is not available 1104, then the secondary TMD position, i.e., the upper left central TMD position, is determined 1108. The availability of motion data for the upper left central TMD candidate is then determined 1110. If the motion data is available, the motion data is returned 1112 to be used as the TMD candidate in the inter-prediction candidate list being constructed. Otherwise, an indication 1114 that no TMD candidate is available is returned.

Figure 14:
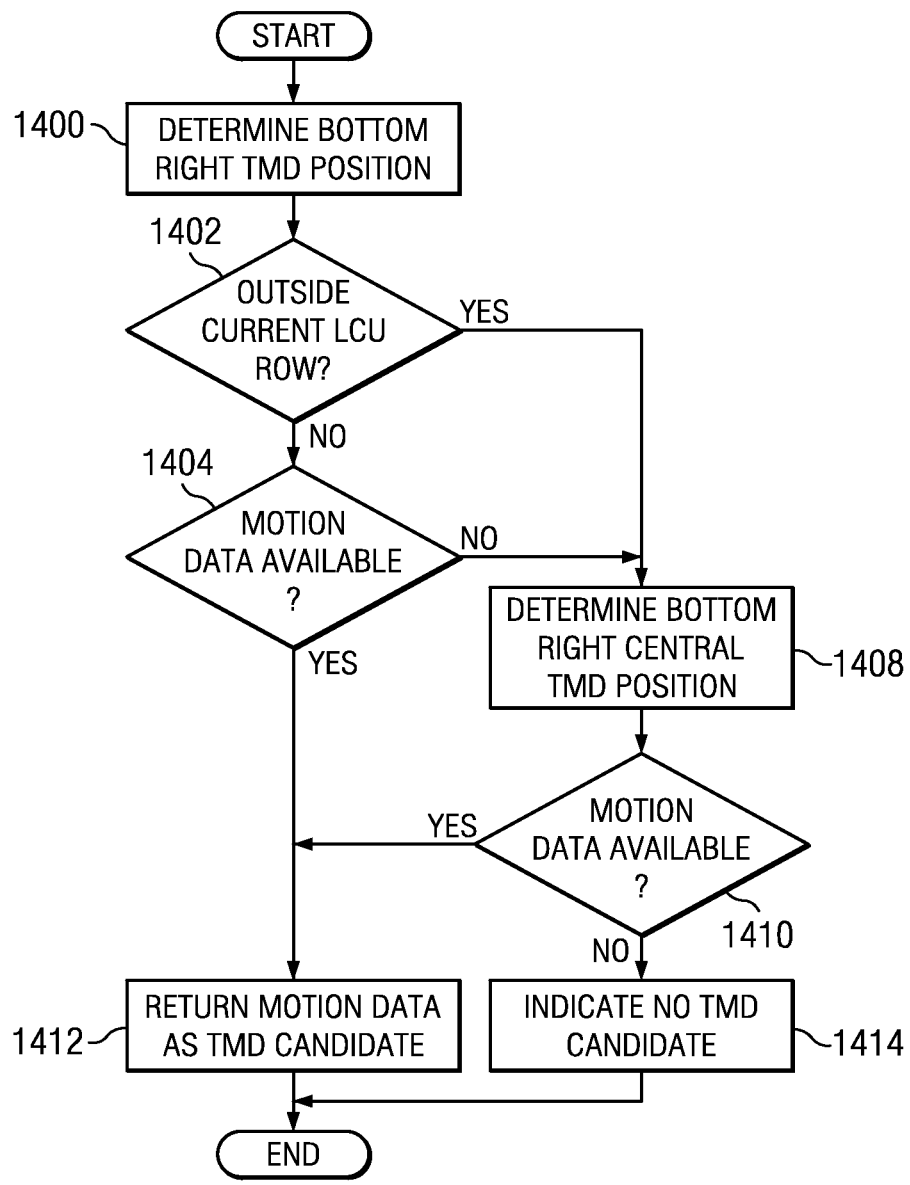
Figure 15:
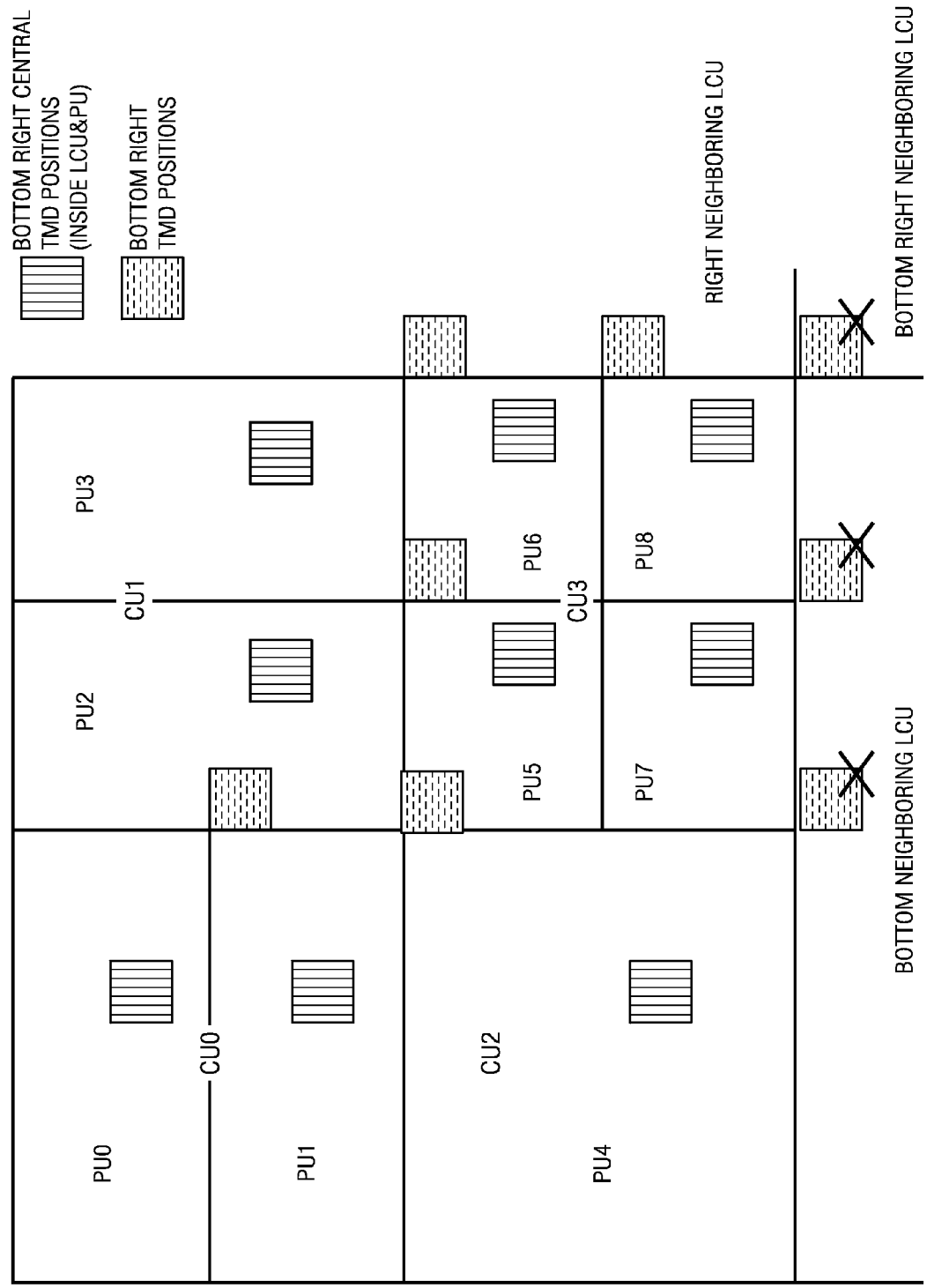

Referring now to the method of FIG. 14, the method uses two TMD positions, a primary TMD position, i.e., the bottom right TMD position outside the co-located PU and a secondary TMD position, i.e., the bottom right central TMD position within the co-located PU. The bottom right central TMD position is defined as follows. Let (xP, yP) be the luminance coordinates of the upper-left corner of the current PU in the current picture, and (puWidth, puHeight) be the size of the current PU. The bottom right central TMD position is defined as the luminance sample position in the co-located picture with the coordinates (xP+puWidth/2, yP+puHeight/2). FIG. 15 shows an example partitioning of an LCU and the two TMD positions relative to the example partitioning.

Referring again to FIG. 14, initially, the primary TMD position, i.e., the bottom right TMD position, is determined 1400. If the position is within the current LCU row 1402, then the availability 1404 of motion data for the bottom right TMD position is determined. In the example of FIG. 15, the bottom right TMD position is within the current LCU row for PU0, PU1, PU2, PU3, PU5 and PU6. If motion data for the bottom right TMD position is available, the motion data is returned 1412 to be used as the TMD candidate in the inter-prediction candidate list being constructed.

If the bottom right TMD position is outside the current LCU row 1402 or the bottom right TMD position is not available 1404, then the secondary TMD position, i.e., the bottom right central TMD position, is determined 1408. In the example of FIG. 15, the bottom right TMD position is outside the current LCU row for PU4, PU7, and PU8. The availability of motion data for the bottom right central TMD position is then determined 1410. If motion data for the bottom right central TMD position is available, the motion data is returned 1412 to be used as the TMD candidate in the inter-prediction candidate list being constructed. Otherwise, an indication 1414 that no TMD candidate is available is returned.

Figure 16:
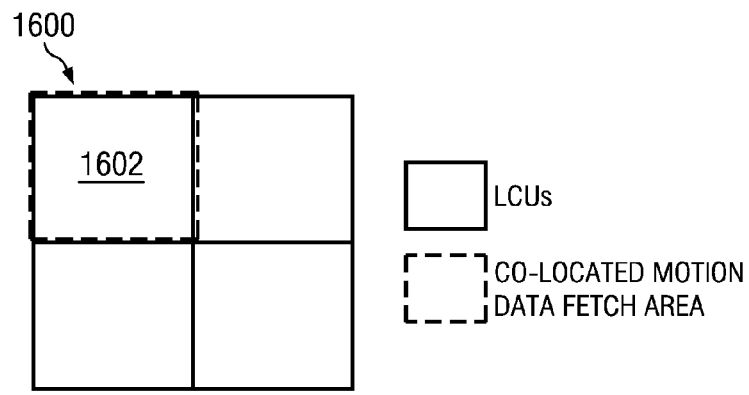
FIG. 16 is an example illustrating a temporal motion data fetch area relative to a co-located LCU when temporal motion data positions are constrained to the co-located LCU.

The methods of FIGS. 17-24 provide TMD candidate derivation in which the TMD positions are constrained to be within the boundaries of the co-located LCU and may not extend into any neighboring LCUs. That is, the fetch area for temporal motion data cannot go beyond the boundaries of the co-located LCU. As is illustrated in FIG. 16, if one of these methods is used, a 64×64 co-located motion data area 1600 needs to be pre-fetched for a 64×64 LCU 1602.

Figure 17:
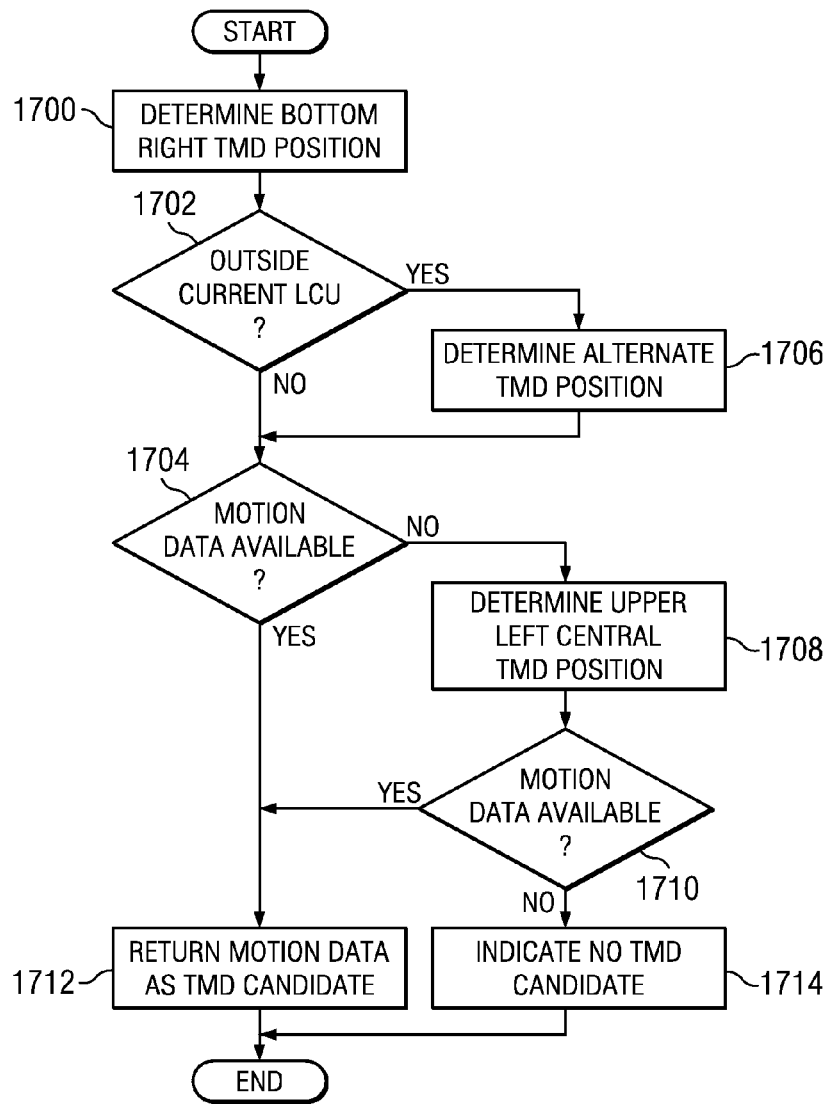
Figure 18:
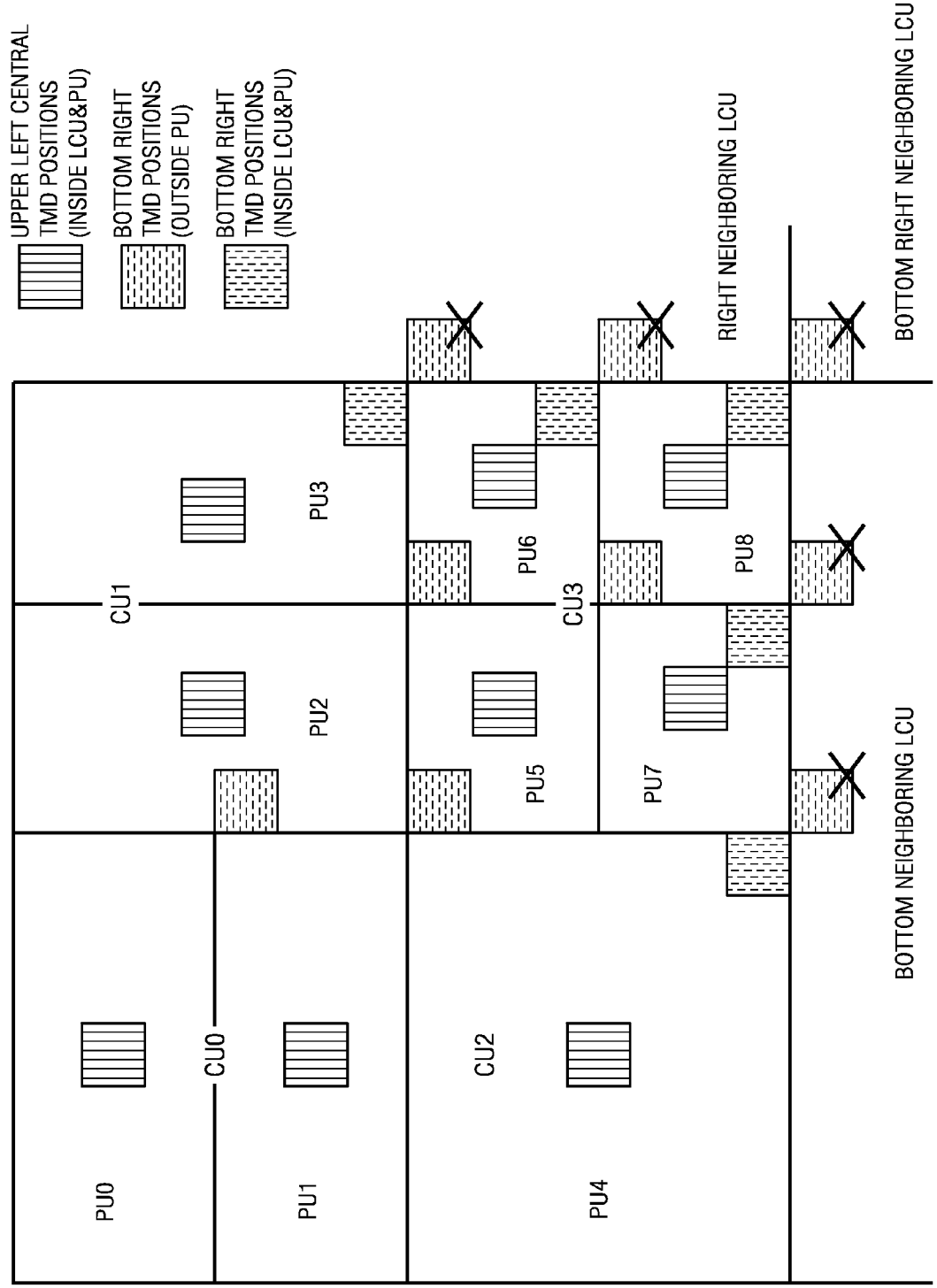

Referring now to the method of FIG. 17, the method uses three TMD positions, a primary TMD position, i.e., the bottom right TMD position outside the co-located PU, a secondary TMD position, i.e., the upper left central TMD position within the co-located PU, and an alternative TMD position that is considered if the bottom right TMD position is outside the co-located LCU. FIG. 18 shows an example partitioning of an LCU and the three TMD positions relative to the example partitioning. The alternative TMD position is a bottom right position inside the co-located PU (and within the co-located LCU).

Referring again to FIG. 17, initially, the primary TMD position, i.e., the bottom right TMD position, is determined 1700. If the position is within the current LCU 1702, then the availability 1704 of motion data for the bottom right TMD position is determined. In the example of FIG. 18, the bottom right TMD position is within the current LCU for PU0, PU1, PU2, and PU5. If motion data for the bottom right TMD position is available, the motion data is returned 1712 to be used as the TMD candidate in the inter-prediction candidate list being constructed.

If the bottom right TMD position is outside the current LCU 1702, then the alternative TMD position is determined 1706. In the example of FIG. 18, the bottom right TMD position is outside the current LCU for PU3, PU4, PU6, PU7, and PU8. The alternative TMD position is the bottom right position within the co-located PU as shown in FIG. 18. If motion data for the alternative TMD position is available, the motion data is returned 1712 to be used as the TMD candidate in the inter-prediction candidate list being constructed.

If motion data for the bottom right TMD position or the alternative TMD position (if considered), is not available 1704, then the secondary TMD position, i.e., the upper left central TMD position, is determined 1708. The availability of motion data for the upper left central TMD position is then determined 1710. If motion data for the upper left central TMD position is available, the motion data is returned 1712 to be used as the TMD candidate in the inter-prediction candidate list being constructed. Otherwise, an indication 1714 that no TMD candidate is available is returned.

Figure 19:
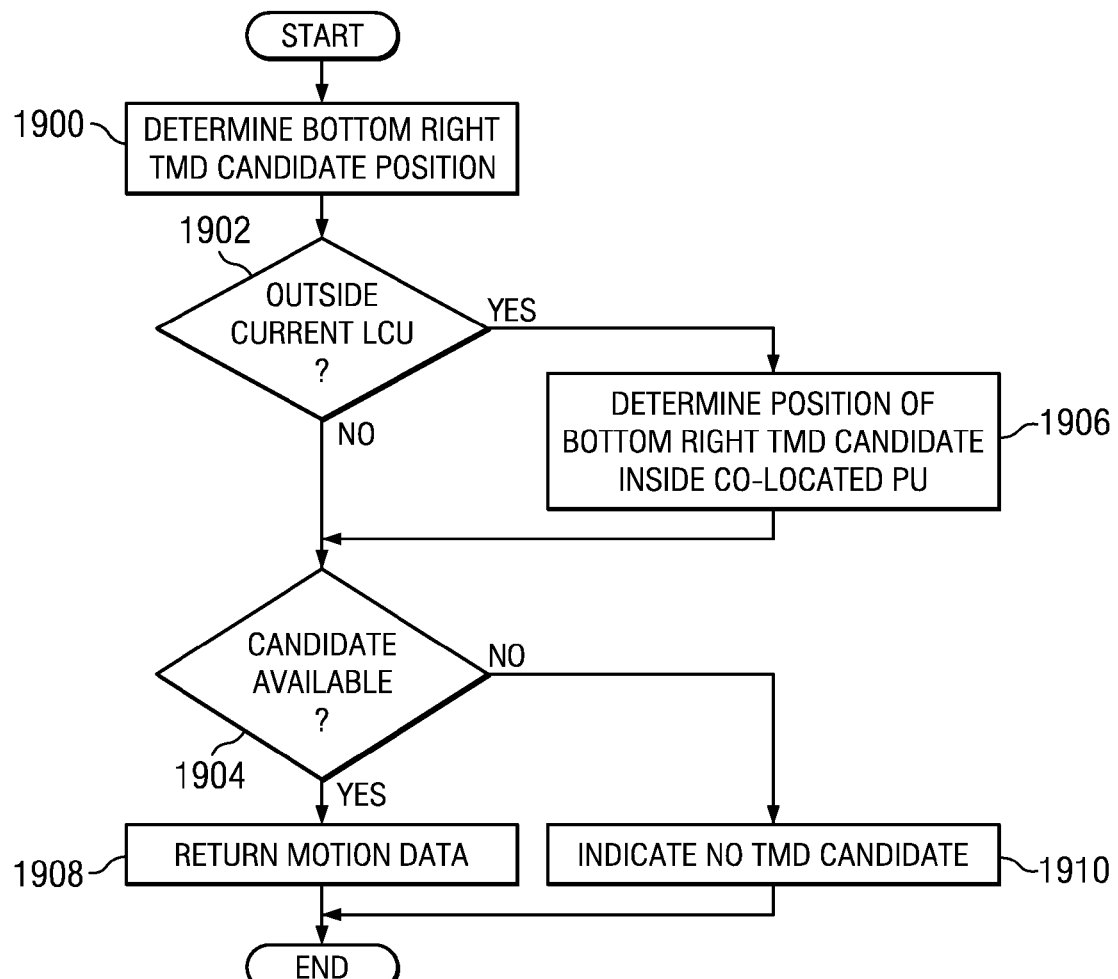
Figure 20:
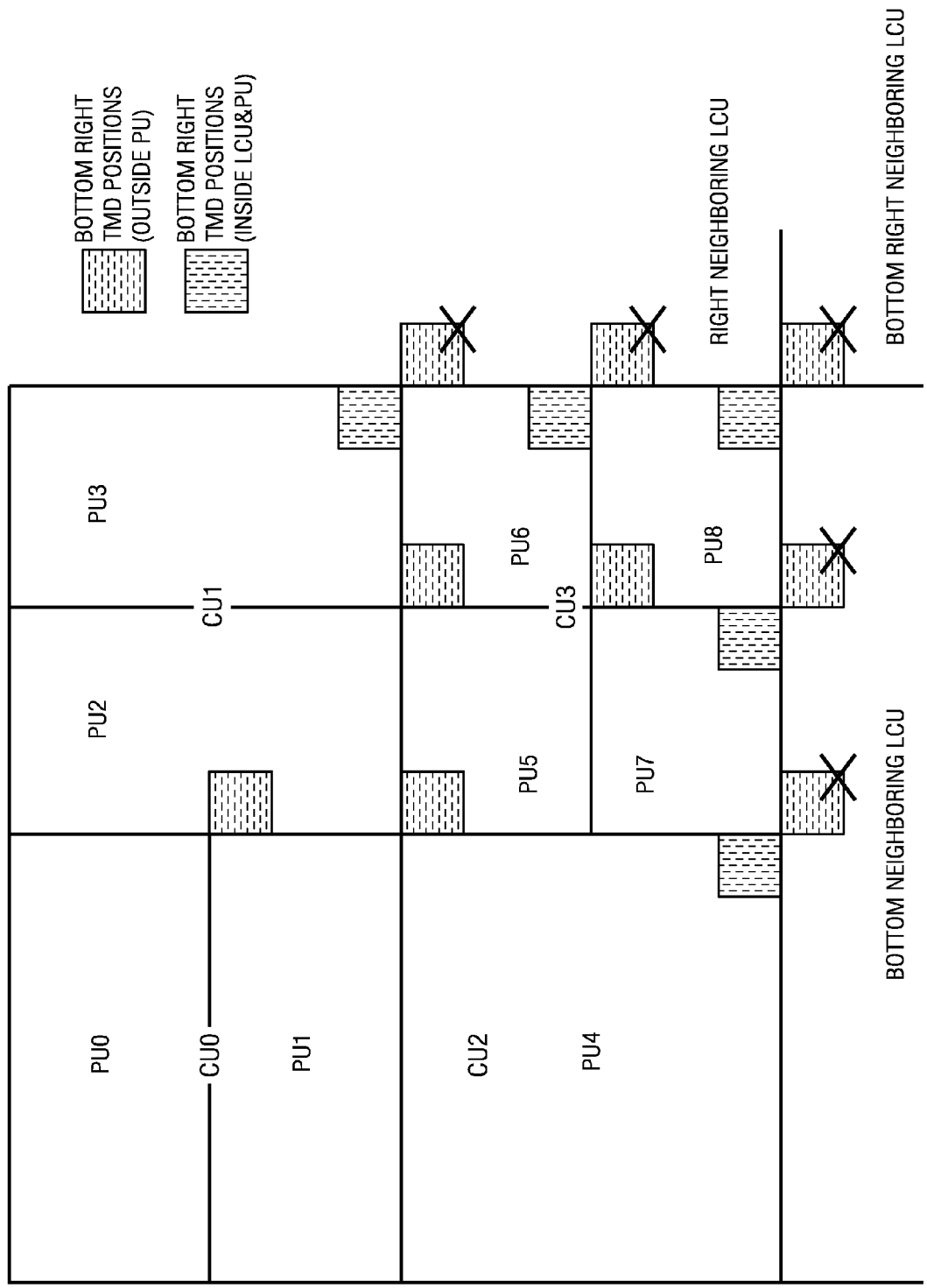

Referring now to the method of FIG. 19, the method uses two TMD positions, a primary TMD position, i.e., the bottom right TMD position outside the co-located PU, and an alternative TMD position within the co-located PU that is considered if the bottom right TMD position is outside the co-located LCU. FIG. 20 shows an example partitioning of an LCU and the two TMD positions relative to the example partitioning.

Referring again to FIG. 19, initially, the primary TMD position, i.e., the bottom right TMD position, is determined 1900. If the position is within the current LCU 1902, then the availability 1904 of motion data for the bottom right TMD position is determined. In the example of FIG. 20, the bottom right TMD position is within the current LCU for PU0, PU1, PU2, and PU5. If motion data for the bottom right TMD position is available, the motion data is returned 1908 to be used as the TMD candidate in the inter-prediction candidate list being constructed. Otherwise, an indication 1910 that no TMD candidate is available is returned.

If the bottom right TMD position is outside the current LCU 1902, then the alternative TMD position, i.e., the bottom right TMD position inside the co-located PU, is determined 1906. In the example of FIG. 20, the bottom right TMD position is outside the current LCU for PU3, PU4, PU6, PU7, and PU8. The availability of motion data for the alternative TMD position is then determined 1904. If motion data for the alternative TMD position is available, the motion data is returned 1908 to be used as the TMD candidate in the inter-prediction candidate list being constructed. Otherwise, an indication 1910 that no TMD candidate is available is returned.

Figure 21:
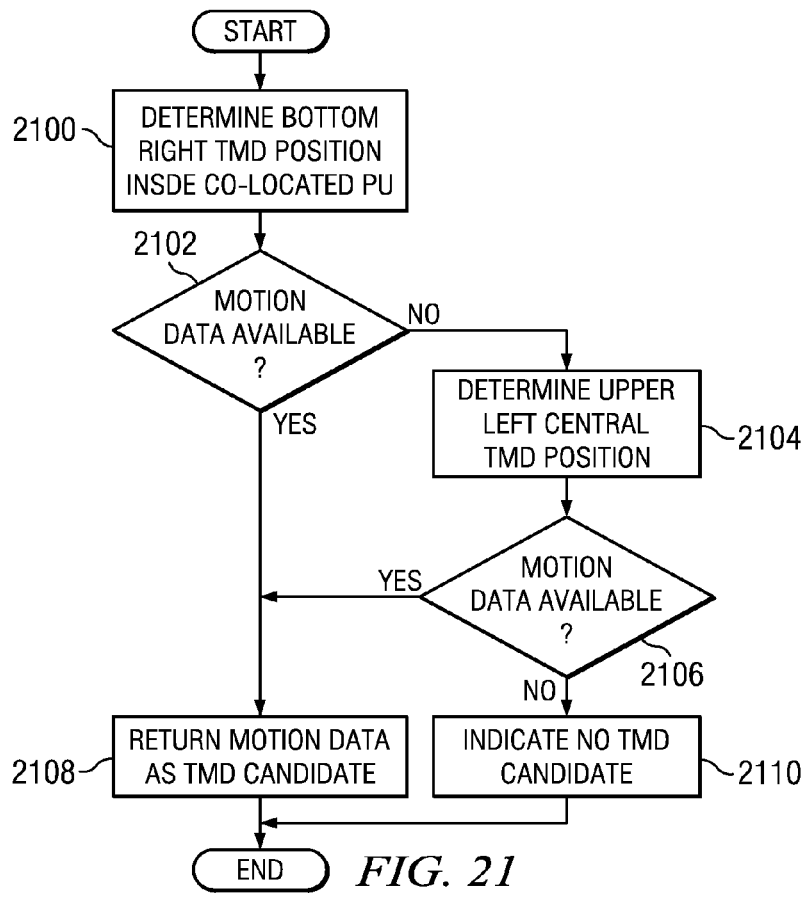
Figure 22:
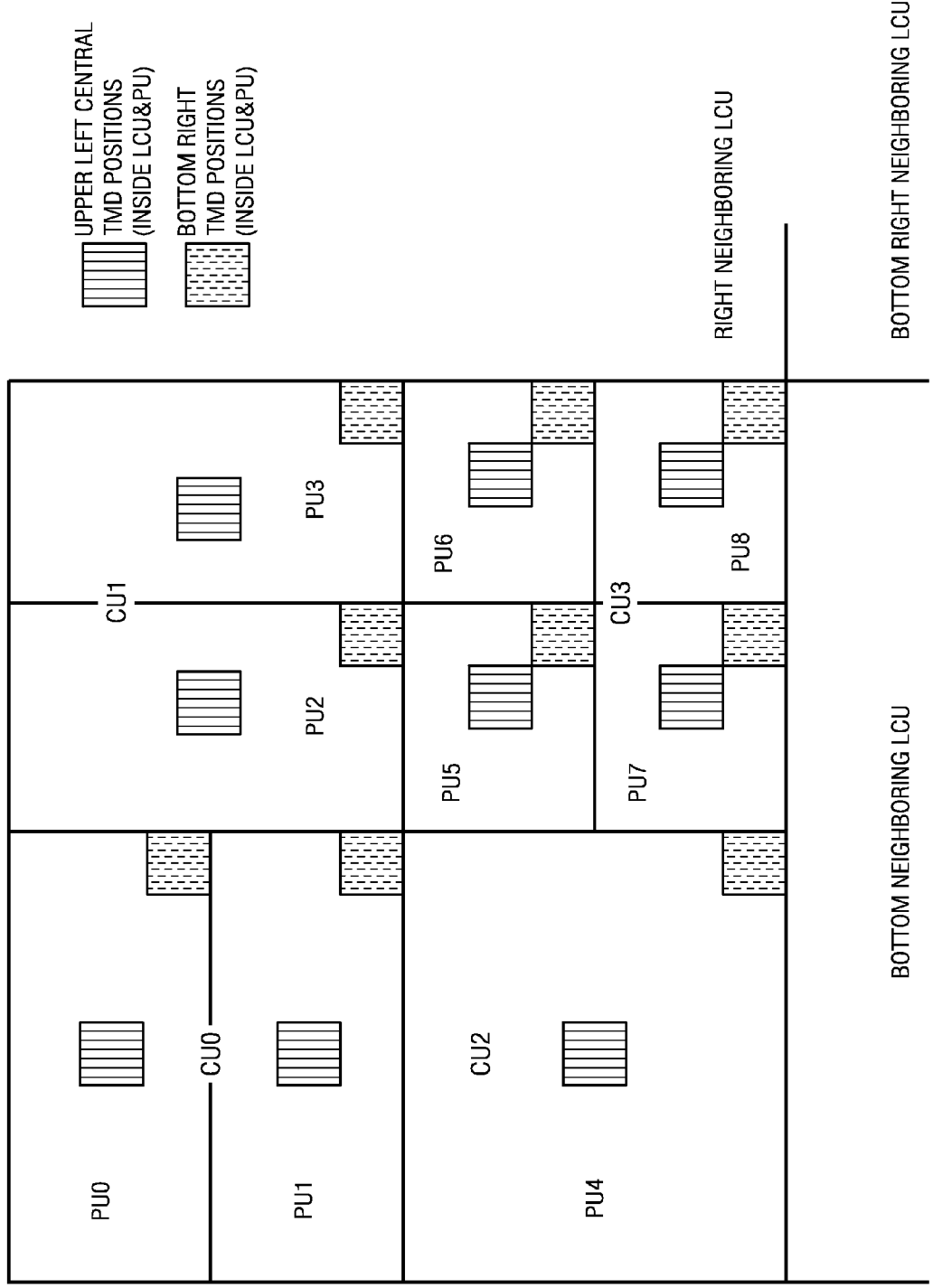

Referring now to the method of FIG. 21, the method uses two TMD positions, a primary TMD position, i.e., the bottom right TMD position within the co-located PU, and a secondary TMD position, i.e., the upper left central TMD position within the co-located PU. FIG. 22 shows an example partitioning of an LCU and the two TMD positions relative to the example partitioning.

Referring again to FIG. 21, initially, the primary TMD position, i.e., the bottom right TMD position inside the co-located PU, is determined 2100. The availability 2102 of motion data for the TMD position is then determined. If motion data for the TMD position is available, the motion data is returned 2108 to be used as the TMD candidate in the inter-prediction candidate list being constructed.

If motion data for the bottom right TMD position (inside the co-located PU) is not available 2102, then the secondary TMD position, i.e., the upper left central TMD position, is determined 2104. The availability of motion data for the upper left central TMD position is then determined 2106. If motion data for the upper left central TMD position is available, the motion data is returned 2108 to be used as the TMD candidate in the inter-prediction candidate list being constructed. Otherwise, an indication 2110 that no TMD candidate is available is returned.

Figure 23:
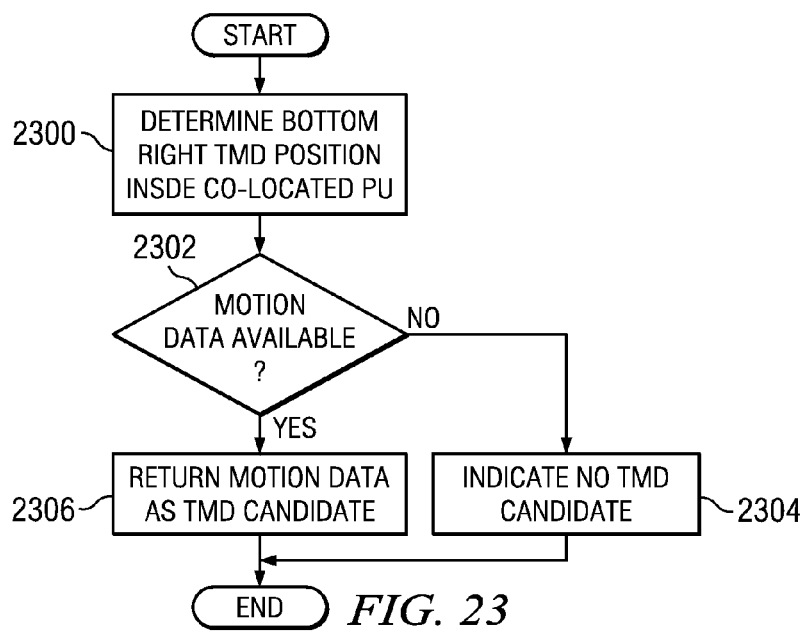
Figure 24:
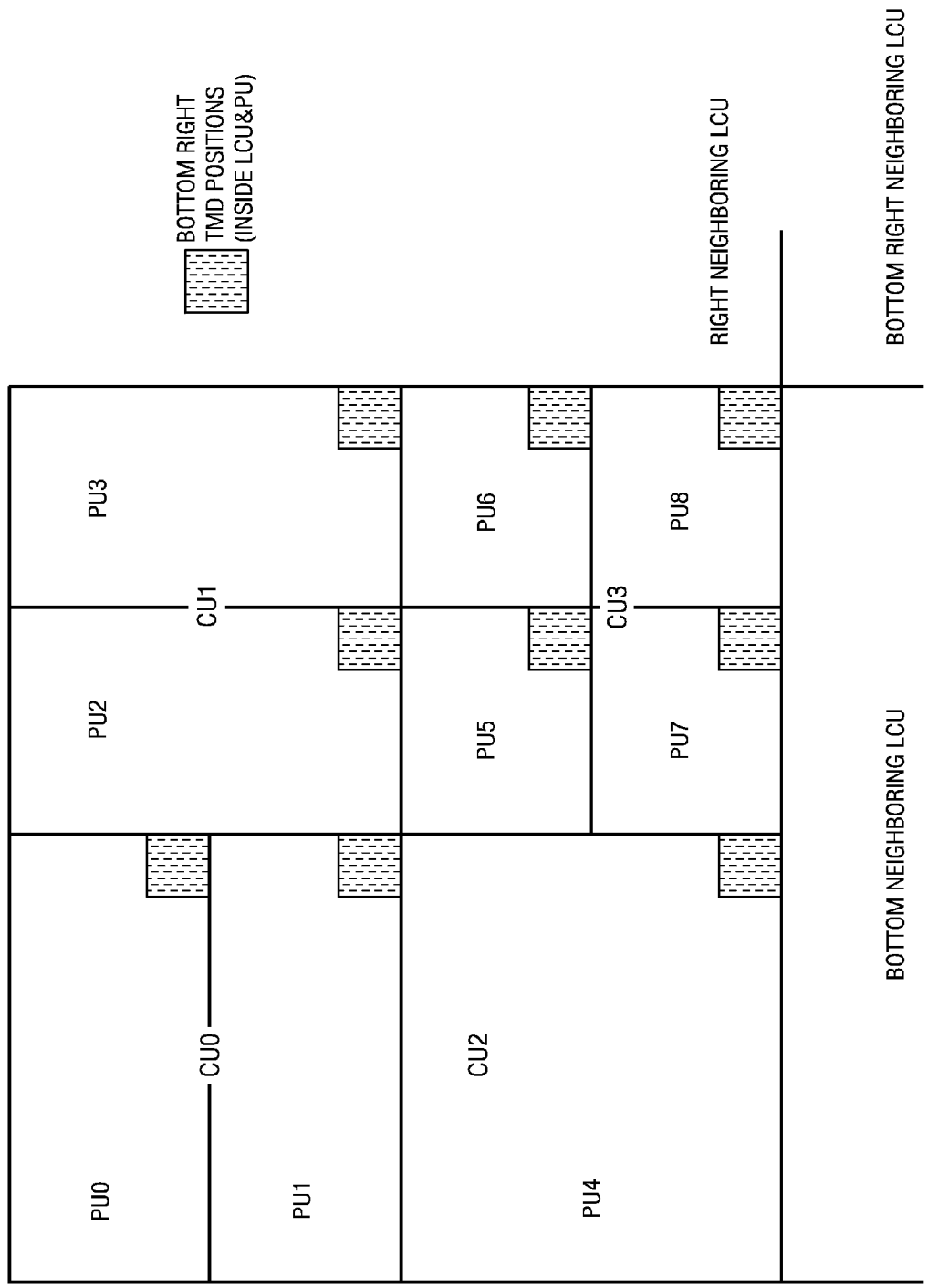

Referring now to the method of FIG. 23, the method uses a single TMD position, the bottom right TMD position within the co-located PU. FIG. 24 shows an example partitioning of an LCU and the TMD position relative to the example partitioning.

Referring again to FIG. 23, initially, the bottom right TMD position inside the co-located PU is determined 2300. The availability 2302 of motion data for the TMD position is then determined. If motion data for the TMD position is available, the motion data is returned 2106 to be used as the TMD candidate in the inter-prediction candidate list being constructed. Otherwise, an indication 2304 that no TMD candidate is available is returned.

Figure 25:
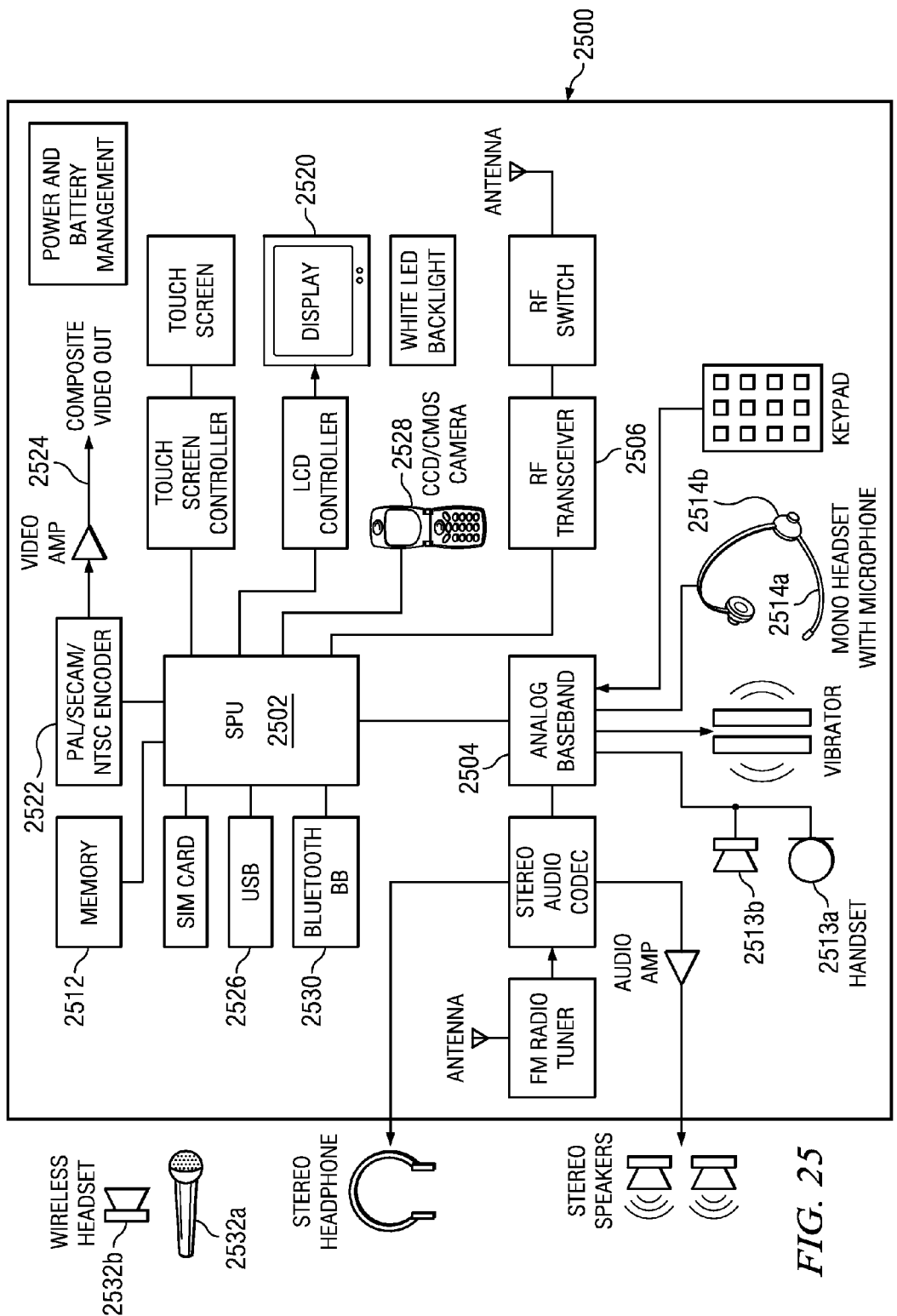
FIG. 25 is a block diagram of an illustrative digital system.

Embodiments of the methods, encoders, and decoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, a set top box, a digital video recorder, etc.). FIG. 25 is a block diagram of a digital system 2500 (e.g., a mobile cellular telephone) that may be configured to use techniques described herein.

As shown in FIG. 25, the signal processing unit (SPU) 2502 includes a digital signal processing system (DSP) that includes embedded memory and security features. The analog baseband unit 2504 receives a voice data stream from the handset microphone 2513*a* and sends a voice data stream to the handset mono speaker 2513*b*. The analog baseband unit 2504 also receives a voice data stream from the microphone 2514*a* or 2532*a* and sends a voice data stream to the mono headset 2514*b* or wireless headset 2532*b*. The analog baseband unit 2504 and the SPU 2502 may be separate ICs. In many embodiments, the analog baseband unit 2504 does not embed a programmable processor core, but performs processing based on configuration of audio paths, filters, gains, etc being setup by software running on the SPU 2502.

The display 2520 may display pictures and video sequences received from a local camera 2528, or from other sources such as the USB 2526 or the memory 2512. The SPU 2502 may also send a video sequence to the display 2520 that is received from various sources such as the cellular network via the RF transceiver 2506 or the Bluetooth interface 2530. The SPU 2502 may also send a video sequence to an external video display unit via the encoder unit 2522 over a composite output terminal 2524. The encoder unit 2522 may provide encoding according to PAL/SECAM/NTSC video standards.

The SPU 2502 includes functionality to perform the computational operations required for video encoding and decoding. In one or more embodiments, the SPU 2502 is configured to perform computational operations for applying one or more techniques for temporal motion data candidate derivation during the encoding process as described herein. Software instructions implementing all or part of the techniques may be stored in the memory 2512 and executed by the SPU 2502, for example, as part of encoding video sequences captured by the local camera 2528. The SPU 2502 is also configured to perform computational operations for applying one or more techniques for temporal motion data candidate derivation as described herein as part of decoding a received coded video sequence or decoding a coded video sequence stored in the memory 2512. Software instructions implementing all or part of the techniques may be stored in the memory 2512 and executed by the SPU 2502.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, although some methods for TMD candidate derivation are described herein as using a primary TMD position that is the bottom right TMD position outside the co-located PU, other embodiments may use a different primary TMD position that is outside the co-located PU. In another example, although some methods for TMD candidate derivation are described herein as using a secondary TMD position that is an upper left central or a bottom right central TMD position, other embodiments may use a different secondary TMD position inside the co-located PU. Similarly, alternative TMD positions outside the co-located PU but within the LCU row or alternative TMD positions with the co-located LCU other than those described herein may be used in other embodiments.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although the method steps may be presented and described herein in a sequential fashion, one or more of the steps shown and described may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for derivation of a temporal motion data (TMD) candidate for a prediction unit (PU) in video encoding or video decoding, the TMD candidate for inclusion in an inter-prediction candidate list for the PU, the method comprising:
    determining a primary TMD position relative to a co-located PU, wherein the co-located PU is a block in a reference picture having a same size, shape, and coordinates as the PU;
    selecting at least some motion data of a secondary TMD position as the TMD candidate when the primary TMD position is in a bottom neighboring PU or in a bottom right neighboring PU relative to the prediction unit, wherein the secondary TMD position is determined relative to the co-located PU and constrained to be within boundaries of a coding unit row containing the PU.

2. The method of claim 1, further comprising:
    determining an alternative TMD position relative to the co-located PU when the primary TMD position is in the bottom neighboring PU or in the bottom right neighboring PU; and
    selecting at least some motion data of the alternative TMD position as the TMD candidate when the motion data of the alternative TMD position is available,
    wherein selecting at least some motion data of a secondary TMD position comprises selecting at least some of the motion data of the secondary TMD position as the TMD candidate when the primary TMD position is in the bottom neighboring PU or in the bottom right neighboring PU when the motion data of the alternative TMD position is not available.

3. The method of claim 1, wherein the primary TMD position is a bottom right neighboring position outside the co-located PU, and the secondary TMD position is inside the co-located PU.

4. The method of claim 3, wherein the secondary TMD position is one selected from an upper left central position inside the co-located PU and a bottom right central position inside the co-located PU.

5. The method of claim 2, wherein the primary TMD position is a bottom right neighboring position outside the co-located PU, the secondary TMD position is inside the co-located PU, and the alternative TMD position is one selected from a bottom right neighboring position outside the co-located PU and inside the co-located LCU row and a bottom right position inside the co-located PU.

6. The method of claim 1, wherein the TMD candidate is one selected from a group consisting of a temporal merging candidate and a temporal motion vector predictor (MVP) candidate.

7. A method for derivation of a temporal merging candidate for a prediction unit (PU) video encoding or video decoding, the temporal merging candidate for inclusion in a merging candidate list for the PU, the method comprising:
    determining a primary temporal motion data (TMD) position relative to a co-located PU, wherein the co-located PU is a block in a reference picture having a same size, shape, and coordinates as the PU and the primary TMD position is a bottom right neighboring position outside the co-located PU and constrained to be located in a coding unit row containing the PU; and
    selecting motion data of a secondary TMD position as the temporal merging candidate when the primary TMD position is in a bottom neighboring PU or in a bottom right neighboring PU, wherein the secondary TMD position is inside the co-located PU and constrained to be within boundaries of a coding unit row containing the PU.

8. The method of claim 7, further comprising:
    determining an alternative TMD position relative to the co-located PU when the primary TMD position is in the bottom neighboring PU or in the bottom right neighboring PU, wherein the alternative TMD position is one selected from a bottom right neighboring position outside the co-located PU and inside a coding unit row containing the PU and a bottom right position relative to the co-located PU; and
    selecting motion data of the alternative TMD position as the temporal merging candidate when the motion data of the alternative TMD position is available,
    wherein selecting motion data of a secondary TMD position comprises selecting the motion data of the secondary TMD position as the temporal merging candidate when the primary TMD position is in the bottom neighboring PU or in the bottom right neighboring PU of the co-located PU and when the motion data of the alternative TMD position is not available.

9. The method of claim 7, wherein the secondary TMD position is one selected from an upper left central position inside the co-located PU and a bottom right central position inside the co-located PU.

10. A method for derivation of a temporal motion vector predictor (MVP) candidate for a prediction unit (PU) in video encoding or video decoding, the temporal MVP candidate for inclusion in an advanced MVP (AMVP) candidate list for the PUT, the method comprising:
    determining a primary temporal motion data (TMD) position relative to a co-located PU in a coding unit, wherein the co-located PU is a block in a reference picture having a same size, shape, and coordinates as the PU and the primary TMD position is a bottom right neighboring position outside the co-located PU and constrained to be located in a coding unit row containing the PU; and
    selecting motion vector data from motion data of a secondary TMD position as the temporal MVP candidate when the primary TMD position is in a bottom neighboring PU or in a bottom right neighboring PU of the co-located PU, wherein the secondary TMD position is inside the co-located PU and constrained to be within boundaries of a coding unit row containing the PU.

11. The method of claim 10, further comprising:
    determining an alternative TMD position relative to the co-located PU when the primary TMD position is in the bottom neighboring PU or in the bottom right neighboring PU, wherein the alternative TMD position is one selected from a bottom right neighboring position outside the co-located PU and a bottom right position inside the co-located PU; and selecting motion data of the alternative TMD position as the temporal MVP candidate when the motion data of the alternative TMD position is available, wherein selecting motion data of a secondary TMD position comprises selecting the motion data of the secondary TMD position as the temporal MVP candidate when the primary TMD position is in the bottom neighboring PU or in the bottom right neighboring PU of the co-located PU and when the motion data of the alternative TMD position is not available.

12. The method of claim 10, wherein the secondary TMD position is one selected from an upper left central position inside the co-located PU and a bottom right central position inside the co-located PU.

* * * * *